United States Patent
Kim et al.

(10) Patent No.: US 10,012,836 B2
(45) Date of Patent: Jul. 3, 2018

(54) HEAD UP DISPLAY FOR VEHICLE

(71) Applicant: LG ELECTRONICS INC., Seoul (KR)

(72) Inventors: Dongwook Kim, Seoul (KR); Youngjin Kim, Seoul (KR); Kyoungil Lee, Seoul (KR); Seunggyu Lee, Seoul (KR); Juhyeok Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/583,416

(22) Filed: May 1, 2017

(65) Prior Publication Data

US 2017/0336628 A1  Nov. 23, 2017

Related U.S. Application Data

(60) Provisional application No. 62/340,503, filed on May 23, 2016.

(30) Foreign Application Priority Data

Jul. 7, 2016  (KR) .................. 10-2016-0086203

(51) Int. Cl.
*G02B 27/01* (2006.01)
*B60K 35/00* (2006.01)
*G02B 5/30* (2006.01)

(52) U.S. Cl.
CPC .......... *G02B 27/0101* (2013.01); *B60K 35/00* (2013.01); *G02B 5/30* (2013.01); *B60K 2350/2056* (2013.01); *G02B 2027/015* (2013.01)

(58) Field of Classification Search
CPC  G02B 27/0101; G02B 5/30; G02B 2027/015; B60K 35/00

See application file for complete search history.

(56) References Cited

U.S. PATENT DOCUMENTS 9,188,779 B2 * 11/2015 Sakai .................. G02B 27/01
2013/0265646 A1   10/2013 Sakai
(Continued)

FOREIGN PATENT DOCUMENTS

JP    2002-303822 A    10/2002
JP    2004-13051 A     1/2004
(Continued)

*Primary Examiner* — Joseph P Martinez
(74) *Attorney, Agent, or Firm* — Birch, Stewart, Kolasch & Birch, LLP

(57) ABSTRACT

A head up display for a vehicle including an imaging device configured to emit first linearly polarized light in a first direction and second linearly polarized light in a second direction perpendicular to the first direction; a polarizing reflection mirror through which the first linearly polarized light is transmitted and from which the second linearly polarized light is reflected; a second reflection mirror spaced apart from the polarizing reflection mirror and at which the first linearly polarized light transmitted through the polarizing reflection mirror is reflected to the polarizing reflection mirror; and a first reflection mirror spaced from the polarizing reflection mirror and configured to reflect the second linearly polarized light reflected from the polarizing reflection mirror to a windshield of the vehicle to produce a first image having a first length from the windshield, and to reflect the first linearly polarized light reflected from the second reflection mirror and transmitted through the polarizing reflection mirror to the windshield of the vehicle to produce a second image having a second length from the windshield different than the first length.

20 Claims, 15 Drawing Sheets

(56) References Cited

U.S. PATENT DOCUMENTS

| | | |
|---|---|---|
| 2015/0061976 A1 | 3/2015 | Ferri |
| 2015/0234185 A1 | 8/2015 | Inomata |
| 2016/0109714 A1 | 4/2016 | Chen |
| 2016/0195727 A1 | 7/2016 | Kuzuhara et al. |
| 2016/0202479 A1 | 7/2016 | Okayama et al. |
| 2016/0202482 A1 | 7/2016 | Kuzuhara et al. |

FOREIGN PATENT DOCUMENTS

| | | |
|---|---|---|
| JP | 2006-91489 A | 4/2006 |
| JP | 2013-214008 A | 10/2013 |
| KR | 10-2015-0093353 A | 8/2015 |
| KR | 10-2015-0104118 A | 9/2015 |
| KR | 10-2016-0042807 A | 4/2016 |
| WO | WO 2015/125247 A1 | 8/2015 |
| WO | WO 2015/159523 A1 | 10/2015 |

\* cited by examiner

HEAD UP DISPLAY FOR VEHICLE

CROSS-REFERENCE TO RELATED THE APPLICATIONS

The present application claims priority under 35 U.S.C. § 365 to U.S. Provisional Application No. 62/340,503 filed on May 23, 2016 and under 35 U.S.C. § 119 to Korean Patent Application No. 10-2016-0086203 filed on Jul. 7, 2016, all of which are hereby incorporated by reference in their entirety.

BACKGROUND OF THE INVENTION

1. Field of the Invention

The present invention relates to a head up display for a vehicle and more specifically to a head up display for a vehicle forming two virtual images.

2. Description of the Related Art

A head up display for a vehicle emits image light toward a windshield of the vehicle and displays various information such as driving information. In more detail, the head up display includes a display panel which generates and outputs image light, and at least one mirror which reflects the image light generated at the display panel.

Further, the image light generated at the display panel is made incident on the windshield of the vehicle using a mirror and thus the driver can see a virtual image in the front side position of the windshield. The head up display can also form two virtual images using two image sources, improving the convenience of the head-up display.

For example, KR 10-2015-0093353 A (published on Aug. 18 2015) discloses a technology which forms two virtual images using two image sources. However, the structure is complicated, its power consumption is increased, and its overall size is increased.

Meanwhile, the head up display may include one image source, and form two light paths having different lengths and thus it is possible to form the two virtual images. As an example, US 2013/0265646 A1 (published on Oct. 10 2013) discloses a technology which includes one image source, one half mirror, and one or three flat mirrors to form two virtual images. However, because the half mirror is used, the light loss is large, and because a plurality of flat mirrors are used in order to obtain a distance difference between the two virtual images, a precise distance setting between the virtual images is difficult due to interference with each size of one half mirror and the plurality of flat mirrors.

Further, US 2015/0061976 A1 (published on Mar. 5, 2013) discloses a technology that forms two virtual images using one image source, a plurality of flat mirrors, and a light baffle. However, because the plurality of path mirrors disposed at different angles from each other form a light path sequentially reflecting light, the number of its component is large and its structure is complicated.

SUMMARY OF THE INVENTION

Accordingly, one object of the present invention is to address the above-noted and other problems of the related art.

Another object of the present invention is to provide a compact head up display for a vehicle in which the number of its component is minimized.

To achieve these and other advantages and in accordance with the purpose of the present invention, as embodied and broadly described herein, the present invention provides a head up display for a vehicle including an imaging device configured to emit first linearly polarized light in a first direction and second linearly polarized light in a second direction perpendicular to the first direction; a polarizing reflection mirror through which the first linearly polarized light is transmitted and from which the second linearly polarized light is reflected; a second reflection mirror spaced apart from the polarizing reflection mirror and at which the first linearly polarized light transmitted through the polarizing reflection mirror is reflected to the polarizing reflection mirror; and a first reflection mirror spaced from the polarizing reflection mirror and configured to reflect the second linearly polarized light reflected from the polarizing reflection mirror to a windshield of the vehicle to produce a first image having a first length from the windshield, and to reflect the first linearly polarized light reflected from the second reflection mirror and transmitted through the polarizing reflection mirror to the windshield of the vehicle to produce a second image having a second length from the windshield different than the first length.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1:
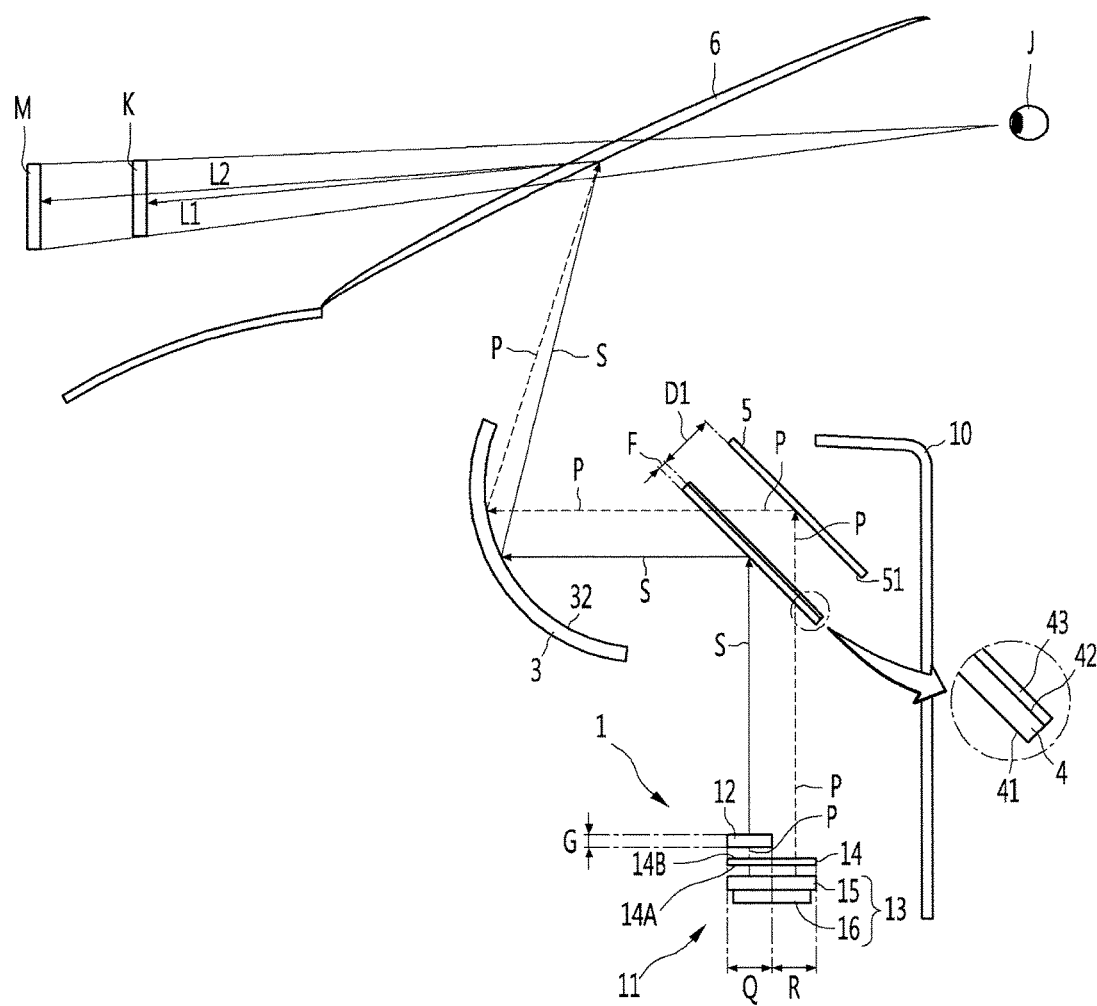
FIG. 1 is a side view illustrating a head up display for a vehicle according to a first embodiment of the present invention.
Figure 2:
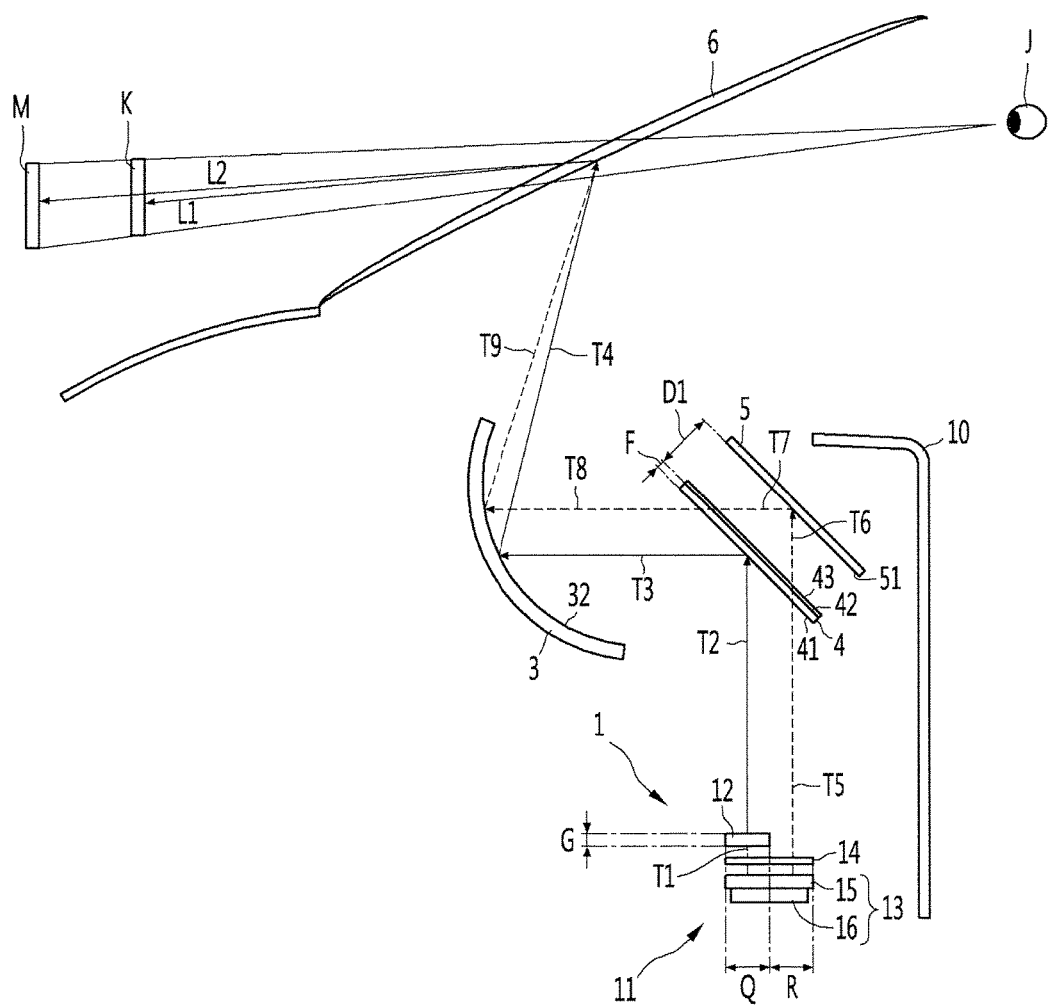
FIG. 2 is a side view illustrating a light path of the head up display for a vehicle according to the first embodiment of the present invention.

The present invention will become more fully understood from the detailed description given hereinbelow and the accompanying drawings, which are given by illustration only, and thus are not limitative of the present invention, and wherein:

FIG. 1 is a side view illustrating a head up display for a vehicle, and FIG. 2 is a side view illustrating a light path of the head up display according to the first embodiment of the present invention. As shown, the head up display includes an imaging device 1, a first reflection mirror 3, a polarizing reflection mirror 4, and a second reflection mirror 5. A head up display for a vehicle emits image light toward a windshield 6 of the vehicle, and is housed in an instrument panel 10 of a front side of the driver's seat of the vehicle or is placed on the instrument panel 10 and can be irradiated with the image light in an upper side direction.

Further, the imaging device 1 emits linearly polarized light in a first direction and linearly polarized light in a second direction perpendicular to the linearly polarized light in the first direction. The imaging device 1 includes an image source 11 which emits the linearly polarized light in the first direction, and a half wavelength phase delay unit 12 which converts a portion of the linearly polarized light in the first direction emitted from the image source 11 into the linearly polarized light in the second direction by half a wavelength.

The image source 1 includes a display panel 13 which emits the image light, and a linear polarizer 14 which allows the image light emitted from the display panel 13 to be linearly polarized in the first direction. The display panel 13 includes a display element 15 and a light source 16 which irradiates the display element 15 with light. Further, the display panel 13 emits the image light toward the linear polarizer 14 and can generate the image light by controlling an electric signal such as a liquid crystal display (LCD) panel, a light emitting diode (LED) panel, and an organic light emitting diode (OLED) panel, as an image generating unit.

In addition, the light source 16 may be a backlight unit (BLU) which irradiates light toward the display element 15. The light source 16 may include a LED, an OLED, or the like. Further, the linear polarizer 14 allows only the linearly polarized light in a first direction among the image light emitted from the display panel 13 to pass through the linear polarizer. Non-polarized light is first emitted from the display panel 13 and the non-polarized light is polarized in the first direction within the linear polarizer 14. A P-wave linearly polarized light P or an S-wave linearly polarized light S can thus be emitted from the linear polarizer 14.

The linear polarizer 14 can be provided in the inside of the display element 15. In this instance, the linear polarized light which is polarized by the linear polarizer 14 can be emitted in the display element 15. Further, the linear polarizer 14 can be provided in the outside of the display element 15. In this instance, the non-polarized light emitted from the display element 15 can be incident on the linear polarizer 14 and the linear polarized light polarized in the first direction can be emitted from the linear polarizer 14.

When the linear polarizer 14 is disposed in the outside of the display element 15, one surface 14A of the linear polarizer 14 is disposed to face the display element 15 and the other surface 14B of the linear polarizer 14 is disposed toward the polarized reflection mirror 4. The surface 14A can be a light incident surface and the surface 14B can be a light emitting surface. The linear polarizer 14 can also be disposed to cover the light emitting surface of the display element 15.

When the display panel 13 emits the non-polarized light in the upper side direction, the linear polarizer 14 can be positioned in the upper side of the display element 15. When the display panel 13 emits the non-polarized light in the lower side direction, the linear polarizer 14 can be disposed to be positioned in the lower side of the display element 15.

In addition, the half wavelength phase delay unit 12 allows the wavelength of the linear polarized light which is incident from the image source 11 to be converted by half of a wavelength. The half wavelength phase delay unit 12 can be a half wave plate. For example, when the linearly polarized light emitted from the image source 11 is the P-wave linearly polarized light P, the P-wave linearly polarized light P can be emitted to the phase delay unit 12, converted into the S-wave linearly polarized light S in the half wavelength phase delay unit 12 and then emitted.

In addition, when the linearly polarized light emitted from the image source 11 is the S-wave linearly polarized light S, the S-wave linearly polarized light S can be emitted to the phase delay unit 12, converted into the P-wave linearly polarized light P in the half wavelength phase delay unit 12 and then emitted. The half wavelength phase delay unit 12 can be disposed between the light emitting surface of the image source 11 and one surface of the polarizing reflection mirror 4. When the image source 11 includes the linear polarizer 14, the light emitting surface 14B of the linear polarizer 14 can be the light emitting surface of the image source 11.

Further, the half wavelength phase delay unit 12 converts a portion of the linearly polarized light in a first direction emitted from the image source 11 into the linearly polarized light in a second direction perpendicular to the linearly polarized light in the first direction by half of a wavelength. The half wavelength phase delay unit 12 has a smaller size than the size of the linear polarizer 14. In particular, the half wavelength phase delay unit 12 may have a smaller size than the size of the light emitting surface 14B of the linear polarizer 14.

In addition, the half wavelength phase delay unit 12 faces a portion area of the linear polarizer 14. Preferably, the half wavelength phase delay unit 12 faces only a portion area of the light emitting surface 14B of the linear polarizer 14 and does not face the other area of the light emitting surface 14B of the linear polarizer 14.

Also, a portion of the linearly polarized light emitted from the linear polarizer 14 is emitted to the half wavelength phase delay unit 12 and is converted by half of a wavelength and the rest of the linearly polarized light emitted from the linear polarizer 14 is not incident on the half wavelength phase delay unit 12 but proceeds to the polarizing reflection mirror 4.

The linear polarizer 14 also includes a first area Q which faces one surface of the half wavelength phase delay unit 12 and a second area R which faces one surface of the polarizing reflection mirror 4. The linearly polarized light in a first direction emitted from the first area Q of the linear polarizer 14 is incident on the half wavelength phase delay unit 12, is converted into the linearly polarized light in a second direction by half of a wavelength, and then emitted toward the polarizing reflection mirror 4 from the half wavelength phase delay unit 12.

In addition, the linearly polarized light in a first direction emitted from the second area R of the linear polarizer 14 is not incident on the half wavelength phase delay unit 12, passes by the half wavelength phase delay unit 12, and then proceeds or travels to the polarizing reflection mirror 4. For example, when the P-wave linearly polarized light P is emitted from both the first area Q and the second area R of the linear polarizer 14, the P-wave linearly polarized light P emitted from the first area Q is converted into the S-wave linearly polarized light S and then proceeds to the polarizing reflection mirror 4. The Wavelength of the P-wave linearly polarized light P emitted from the second area R is not converted by the linear polarizer 14 and the P-wave linearly polarized light P proceeds to the polarizing reflection mirror 4 as P-wave linearly polarized light P.

Further, the imaging device 1 which is a combination of the image source 11 and the half wavelength phase delay unit 12 may be one kind of different type linearly polarized light emitter which emits two linearly polarized light of which the polarizing directions are different from each other. Also, the first reflection mirror 3 reflects light to the windshield 6 of the vehicle. The first reflection mirror 3 can reflect the light transmitting through the polarizing reflection mirror 4 and the light reflected from the polarizing reflection mirror 4 toward the windshield 6.

In addition, the first reflection mirror 3 is disposed on the front side of the polarizing reflection mirror 4. A rear surface 32 of the first reflection mirror 3 faces the front surface 41 of the polarizing reflection mirror 4 in the longitudinal direction. As shown, the first reflection mirror 3 may be a concave mirror.

In addition, the first reflection mirror 3 can be disposed to be inclined by a predetermined angle, can reflect light from the polarizing reflection mirror 4 and reflect the light transmitting through the polarizing reflection mirror 4 in the upper side direction. Here, the upper side direction may include the entirety of the vertical direction, the upper side direction which is inclined in the rear side direction by a predetermined angle and the upper side direction which is inclined in the front side direction by a predetermined angle.

The polarizing reflection mirror 4 may also be a beam splitter through which the linearly polarized light of the same direction as the direction of the linearly polarized light emitted from the image source 11 is transmitted and from which the linearly polarized light of the perpendicular to the direction of the linearly polarized light emitted from the image source 11 is reflected.

Further, the polarizing reflection mirror 4 is disposed on the rear side of the first reflection mirror 3 and spaced apart from the first reflection mirror 3. The polarizing reflection mirror 4 may be a selective polarizing element through which the linearly polarized light in a first direction is transmitted and which reflects the linearly polarized light in a second direction. Preferably, the polarizing reflection mirror 4 includes a wire grid polarizer (WGP) disposed on the rear side of the first reflection mirror 3. In particular, the wire grid polarizer reflects the linearly polarized light perpendicular to a polarization transmission axis. The linear polarized light which matches the polarization transmission axis of the wire grid polarizer thus transmits through the wire grid polarizer.

In addition, the polarizing reflection mirror 4 including the wire grid polarizer can maintain light brightness between the first reflection mirror 3 and the second reflection mirror 5 and maintain the selective transmitting/reflecting features while the light which is incident from each of the image source 11, the half wavelength phase delay unit 12 and the second reflection mirror 5 and which has a wide incident angle is incident on the polarizing reflection mirror 4.

When the linearly polarized light in a first direction is the P-wave linearly polarized light P, the P-wave linearly polarized light P can be transmitted through the polarizing reflection mirror 4, and the polarizing reflection mirror 4 can reflect the S-wave linearly polarized light S. In addition, when the linearly polarized light in a first direction is the S-wave linearly polarized light S, the S-wave linearly polarized light S can be transmitted through the polarizing reflection mirror 4, and the polarizing reflection mirror 4 can reflect the P-wave linearly polarized light P.

The polarizing reflection mirror 4 is also disposed to face the half wavelength phase delay unit 12 and the image source 11 in the vertical direction and to face the first reflection mirror 3 in the longitudinal direction. The polarizing reflection mirror 4 may be a wire grid polarizer through which the linearly polarized light in a first direction which is emitted from the second area R of the image source 11 is transmitted and which reflects the linearly polarized light in a second direction emitted from the half wavelength phase delay unit 12 to the first reflection mirror 3.

In addition, the linearly polarized light in a first direction transmitting through the polarizing reflection mirror 4 is incident on the second reflection mirror 5 and then reflected from the second reflection mirror 5 toward the rear surface 42 of the polarizing reflection mirror 4. The linearly polarized light in a first direction reflected toward the rear surface 42 of the polarizing reflection mirror 4 transmits through the polarizing reflection mirror 4 and proceeds to the first reflecting unit 3.

The polarizing reflection mirror 4, which is a selective polarized device, can implement two virtual images while minimizing the light loss, and because light loss is small, has advantages that the brightness of the image source 11 is lowered. Further, the polarizing reflection mirror 4 can lower the power consumption of the image source 11, reduce the size of a heat radiating portion which allows the heat of the image source 11 to be radiated, and further simplifies the structure of the heat radiating portion.

Further, the polarizing reflection mirror 4 is disposed between the first reflection mirror 3 and the second reflection mirror 5 and is inclined between the first reflection mirror 3 and the second reflection mirror 5, for the reflection in the front direction of the linearly polarized light in a second direction and the transmission in the front direction of the linearly polarized light in a first direction.

Because the polarizing reflection mirror 4 performs the selective transmission/reflection of the linearly polarized light between the two reflection mirrors 3 and 5, the present embodiment minimizes the number of the optical components for two virtual images and is compact.

In addition, the front surface 41 of the polarizing reflection mirror 4 is inclined toward the front lower side, and the rear surface 42 of the polarizing reflection mirror 4 faces the front surface 51 of the second reflection mirror 5. The surface 42 facing the second reflection mirror 5 may further include an anti-reflection coating layer 43. Here, the anti-reflection coating layer 43 reduces the surface reflection of the surface 42 and reduces the noise by the reflecting light of the transmission light.

In other words, the amount of the light transmitting through the polarizing reflection mirror 4 increases. Further, the linearly polarized light in a first direction which is reflected from the second reflection mirror 5 is then incident on the polarizing reflection mirror 4 while the surface reflection by the anti-reflection coating layer 43 is minimized.

Further, the second reflection mirror 5 is spaced apart from the polarizing reflection mirror 4 and reflects the light transmitting through the polarizing reflection mirror 4 to the polarizing reflection mirror 4. The second reflection mirror 5 can also be disposed to face the polarizing reflection mirror 4 and may be a flat mirror facing the polarizing reflection mirror 4.

In addition, the second reflection mirror 5 is spaced apart from the polarizing reflection mirror 4 by a predetermined distance D1 and in this example is disposed to be parallel to the polarizing reflection mirror 4. Thus, the front surface 51 of the second reflection mirror 5 is inclined toward the front lower side.

Thus, the head up display for a vehicle forms a first virtual image K at a first position to which the distance from the windshield 6 is close and forms a second virtual image M at a second position to which the distance from the windshield 6 is relatively far. In more detail, the first virtual image K is formed by a short distance light path which includes the image source 11, the half wavelength phase delay unit 12, the polarizing reflection mirror 4, the first reflection mirror 3 and the windshield 6.

In addition, the second virtual image M is formed by a long distance light path which includes the image source 11, the polarizing reflection mirror 4, the second reflection mirror 5, the polarizing reflection mirror 4, the first reflection mirror 3 and the windshield 6. The long distance light path may further include the distance in which the linearly polarized light in a first direction moves from the polarizing reflection mirror 4 to the second reflection mirror 5 and the distance in which the linearly polarized light in a first direction reflected from the second reflection mirror 5 moves to the polarizing reflection mirror 4 in addition to the short distance light path. The long distance light path includes two times the distance of the thickness F of the polarizing reflection mirror 4 than the short distance light path.

More specifically, as shown in FIG. 2, the short distance light path includes a first path T1 in which the linearly polarized light in a first direction is incident on the half wavelength phase delay unit 12, a second path T2 in which the linearly polarized light in a second direction emitted from the half wavelength phase delay unit 12 is incident on the polarizing reflection mirror 4, a third path T3 in which the linearly polarized light in a second direction reflected from the polarizing reflection mirror 4 is incident on the first reflection mirror 3, and a fourth path T4 in which the linearly polarized light in a second direction reflected from the first reflection mirror 3 is incident on the windshield 6.

In addition, the long distance light path may include a fifth path T5 in which the linearly polarized light in a first direction emitted from the image element 1 is incident on the polarizing reflection mirror 4, a sixth path T6 in which the linearly polarized light in a first direction transmitting through the polarizing reflection mirror 4 is incident on the second reflection mirror 5, a seventh path T7 in which the linearly polarized light in a first direction reflected from the second reflection mirror 5 is incident on the polarizing reflection mirror 4, an eighth path T8 in which the linearly polarized light in a first direction transmitting through the polarizing reflection mirror 4 is incident on the first reflection mirror 3, and a ninth path T9 in which the linearly polarized light in a first direction reflected from the first reflection mirror 3 is incident on the windshield 6.

Here, the length of the fifth path T5 corresponds to the sum of the length of the first path T1, the thickness G of the half wavelength phase delay unit 12 and the length of the second path T2. The eight path T8 corresponds to the third path T3 and the ninth path T9 corresponds to the fourth path T4. In addition, the length L2 of the long distance optical length is longer than the length L1 of the short distance optical length by a sum of two times the thickness F of the polarizing reflection mirror 4, the distance of the sixth path T6, and the seventh path T7.

Hereinafter, the operation of the present invention will be described. In addition, for convenience, the P-wave linearly polarized light P is assumed to be emitted from the image source 11. Also, a portion of the P-wave linearly polarized light P emitted from the image source 11 is converted into the S-wave linearly polarized light S by the half wavelength phase delay unit 12 and then proceeds to the polarizing reflection mirror 4, and the rest of the P-wave linearly polarized light P proceeds to the polarizing reflection mirror 4 in when the wavelength thereof is not converted.

The S-wave linearly polarized light S which is incident on the front surface 41 of the polarizing reflection mirror 4 is reflected to the first reflection mirror 3 by the polarizing reflection mirror 4 and then reflects to the windshield 6 by the first reflection mirror 3. In addition, the P-wave linearly polarized light P which is incident on the front surface 41 of the polarizing reflection mirror 4 transmits through the polarizing reflection mirror 4, proceeds to the second reflection mirror 5, and then reflects to the polarizing reflection mirror 4 by the second reflection mirror 5.

The P-wave linearly polarized light P which is reflected from the second reflection mirror 5 to the polarizing reflection mirror 4 transmits through the polarizing reflection mirror 4 and then proceeds to the first reflection mirror 3 and the P-wave linearly polarized light P reflects to the windshield 6 by the first reflection mirror 3.

In addition, the vehicle driver can recognize the first virtual image K formed by the short distance light path and the second virtual image M formed by the long distance light path through the windshield 6. The head up display thus forms two virtual images K and M of which distances from the windshield 6 are different from each other. The two virtual images K and M of which distances from the windshield are different from each other are recognized by the eyes J of the vehicle driver.

Meanwhile, an example in which the S-wave linearly polarized light S is emitted from the image source 11 is the same as the example in which the P-wave linearly polarized light P is emitted from the image source 11 except for the type of the linearly polarized light and their operations are same. Therefore, a detailed description thereof is omitted.

Figure 3:
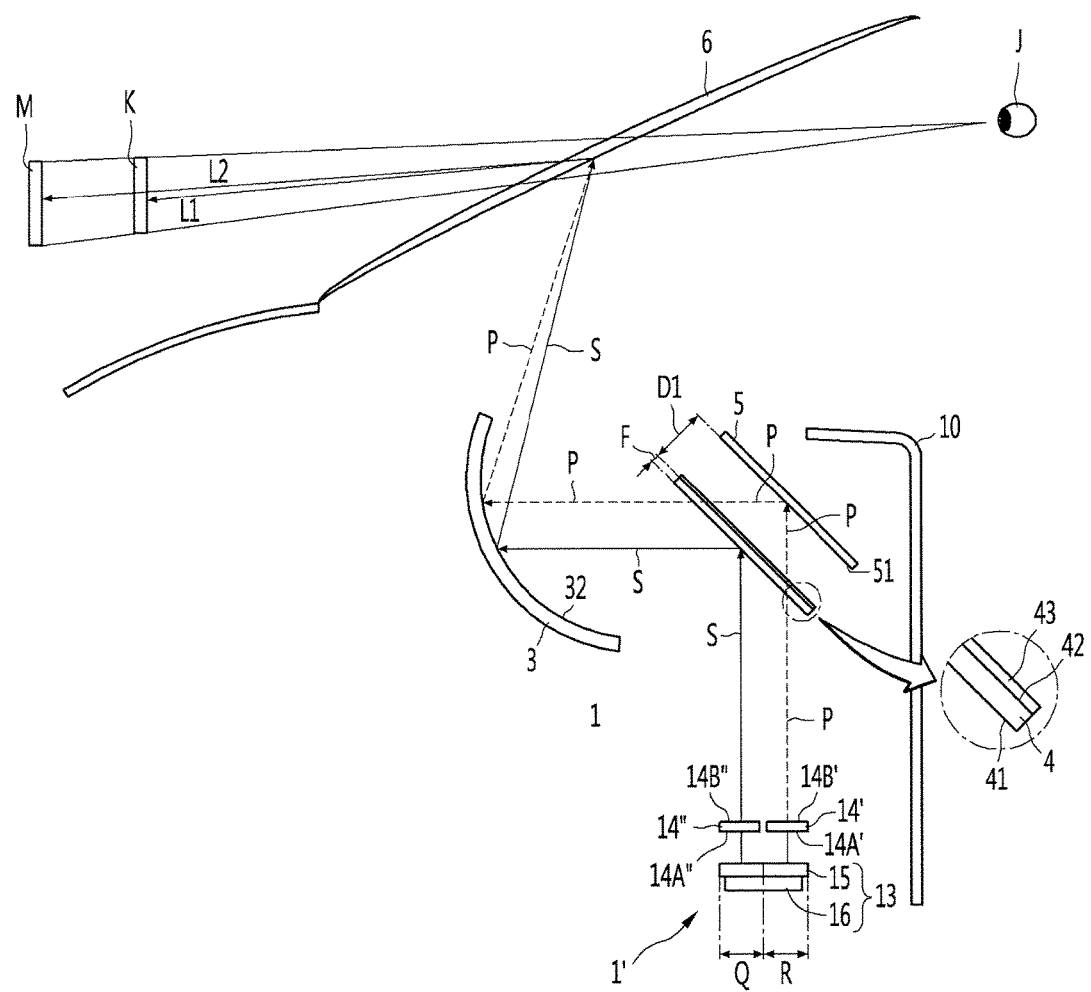
FIG. 3 is a side view illustrating a head up display for a vehicle according to a second embodiment of the present invention.

Next, FIG. 3 is a side view illustrating a head up display for a vehicle according to a second embodiment of the present invention. The imaging device 1' of the present embodiment is different from the first embodiment of the present invention. The other configuration and operation thereof are identical or similar to the first embodiment of the present invention, and thus the same reference numerals are used.

As shown, the imaging device 1' includes a display panel 13 which emits the image light; a first linear polarizer 14' which linearly polarizes the image light emitted from the display panel 13 in the first direction, and a second linear polarizer 14" which linearly polarizes the image light emitted from the display panel 13 in the second direction perpendicular to the first direction.

Further, the display panel 13 includes the display element 15 and the light source 16 as the first embodiment of the present invention. The first linear polarizer 14' and the second linear polarizer 14" are also disposed to face the areas different from each other of the display panel 13. In addition, the linearly polarized lights having directions different from each other are transmitted through the first linear polarizer 14' and the second linear polarizer 14".

Also, the linear polarizer 14' passes only the linearly polarized light in a first direction among the image light emitted from the display panel 13. Non-polarized light emitted from the display panel 13 is polarized in the first direction within the first linear polarizer 14'. Further, the second linear polarizer 14" passes only the linearly polarized light in a second direction among the image light emitted from the display panel 13. Non-polarized light emitted from the display panel 13 is polarized in the first direction in the second linear polarizer 14".

The P-wave linearly polarized light P is emitted from the first linear polarizer 14', and the S-wave linearly polarized light S is emitted from the second linear polarizer 14". In addition, when the S-wave linearly polarized light S is emitted from the first linear polarizer 14', the P-wave linearly polarized light P is emitted from the second linear polarizer 14".

Further, the light incident surface 14A' of the first linear polarizer 14' faces one portion of the light emitting surface of the display panel 13 and the light incident surface 14A" of the second linear polarizer 14" faces the other portion of the light emitting surface of the display panel 13. In addition, the light emitting surface 14B' of the first linear polarizer 14' faces one portion of polarizing reflection mirror 4 and the light emitting surface 14B" of the second linear polarizer 14" faces the other portion of the polarizing reflection mirror 4.

Further, the linearly polarized light emitted from any one of the first linear polarizer 14' and the second linear polarizer 14" transmits through the polarizing reflection mirror 4 and linearly polarized light emitted from the other one of the first linear polarizer 14' and the second linear polarizer 14" reflects from the polarizing reflection mirror 4. Meanwhile, the polarizing reflection mirror 4 faces both the first linear polarizer 14' and the second linear polarizer 14" in the vertical direction and faces the first reflection mirror 3 in the longitudinal direction. The polarizing reflection mirror 4 also includes a first area which faces the first linear polarizer 14' in the vertical direction and a second area which faces the second linear polarizer 14" in the vertical direction.

In addition, the linearly polarized light in a first direction is incident of the first area of the polarizing reflection mirror 4 and the linearly polarized light in a first direction which is incident on the first area transmits through the polarizing reflection mirror 4 and is then incident on the second reflection mirror 5. Further, the linearly polarized light in a second direction emitted from the second linear polarizer 14" is incident on the second area of the polarizing reflection mirror 4 and the linearly polarized light in a second direction which is incident on the second area is reflected to the first reflection mirror 3 by the polarizing reflection mirror 4.

Thus, the present embodiment forms a first virtual image K at a first position to which the distance from the windshield 6 is short and forms a second virtual image M at a second position to which the distance from the windshield 6 is relatively long. The first virtual image K is formed by a short distance light path which includes the display panel 13, the second linear polarizer 14", the polarizing reflection mirror 4, the first reflection mirror 3 and the windshield 6. Also, the second virtual image K is formed by a long distance light path which includes the display panel 11, the first linear polarizer 14', the polarizing reflection mirror 4, the second reflection mirror 3, the polarizing reflection mirror 4, the first reflection mirror 3 and the windshield 6.

Hereinafter, the operation of the present embodiment will be described. Again, as an example, the linearly polarized light in a first direction is assumed to be a P-wave linearly polarized light and the linearly polarized light in a second direction is assumed to be a S-wave linearly polarized light.

The image light emitted from the display panel 13 and non-polarized is distributed into the first linear polarizer 14' and the second linear polarizer 14". The light incident on the first linear polarizer 14' is linearly polarized and the P-wave linearly polarized light P is emitted in the first linear polarizer 14'.

Further, the light incident on the second linear polarizer 14" is linearly polarized and the S-wave linearly polarized light S is emitted in the second linear polarizer 14". The S-wave linearly polarized light S emitted from the second linear polarizer 14" is reflected to the first reflection mirror 3 by the polarizing reflection mirror 4 and reflected to the windshield 6 by the first reflection mirror 3.

In addition, the P-wave linearly polarized light P emitted from the first linear polarizer 14' transmits through the polarizing reflection mirror 4, proceeds to the second reflection mirror 5, and is reflected to the polarizing reflection mirror 4 by the second reflection mirror 5. The P-wave linearly polarized light P reflected from the second reflection mirror 5 to the polarizing reflection mirror 4 transmits through the polarizing reflection mirror 4 and then proceeds to the first reflection mirror 3 and the P-wave linearly polarized light P which proceeds to the first reflection mirror 3 is reflected to the windshield 6 by the first reflection mirror 3.

Further, the vehicle driver can recognize the first virtual image K formed by the short distance light path through the windshield 6 and the second virtual image M formed by the long distance light path through the windshield 6. Meanwhile, examples in which the linearly polarized light in a first direction is the S-wave linearly polarized light S and the linearly polarized light in a second direction is the P-wave linearly polarized light P are different in only the type of the linearly polarized light and their operations are same. Therefore, detailed descriptions are omitted.

Figure 4:
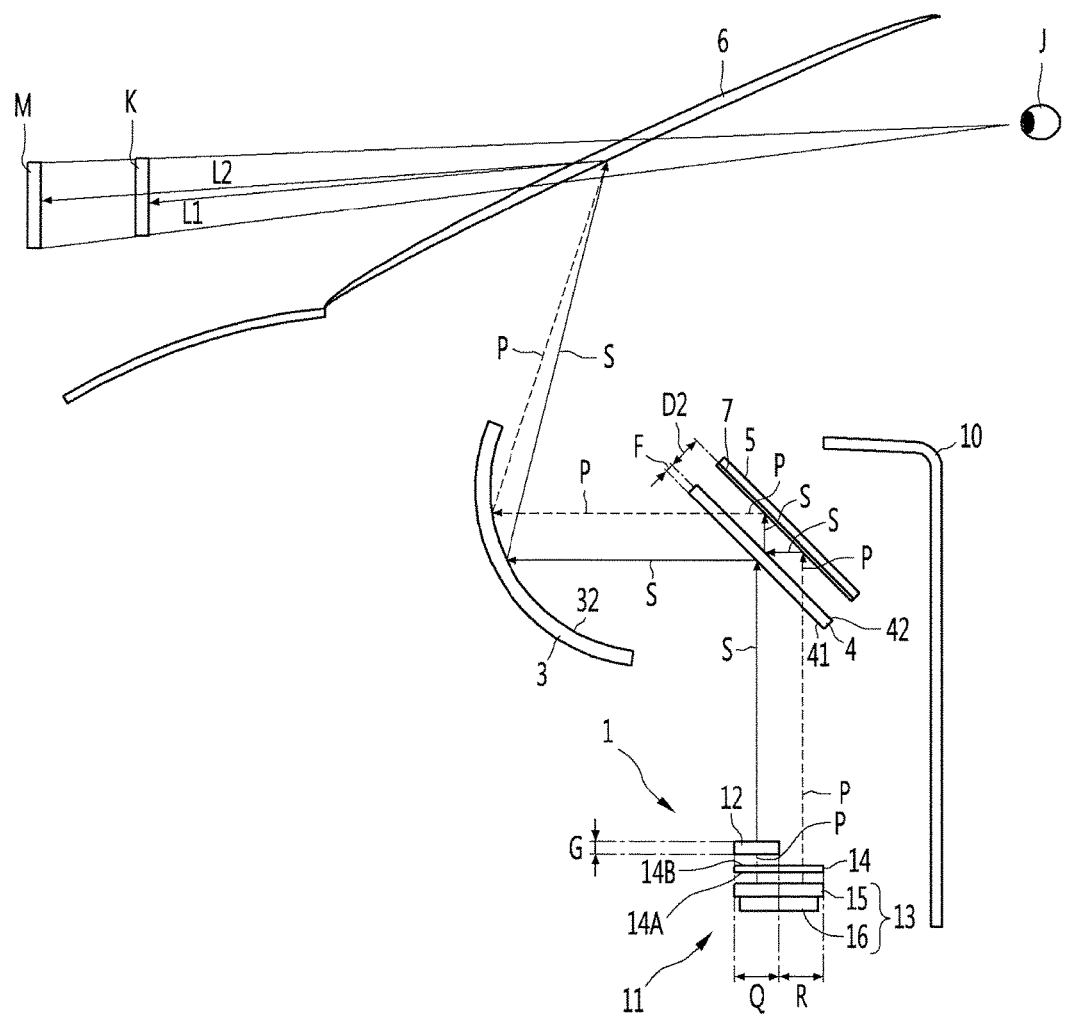
FIG. 4 is a side view illustrating a head up display for a vehicle according to a third embodiment of the present invention.
Figure 5:
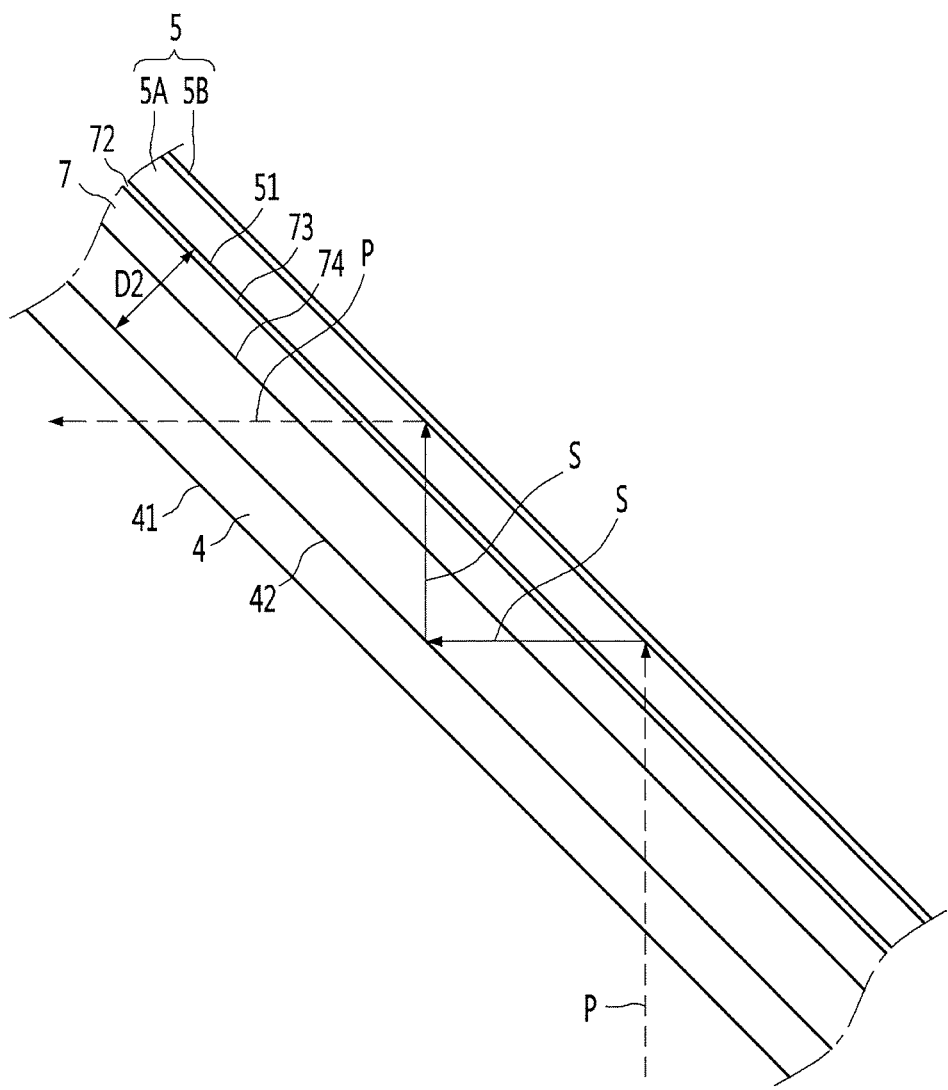
FIG. 5 is an expanded side view illustrating a quarter wavelength phase delay unit, a second reflection mirror and a polarizing reflection mirror in FIG. 4.
Figure 6:
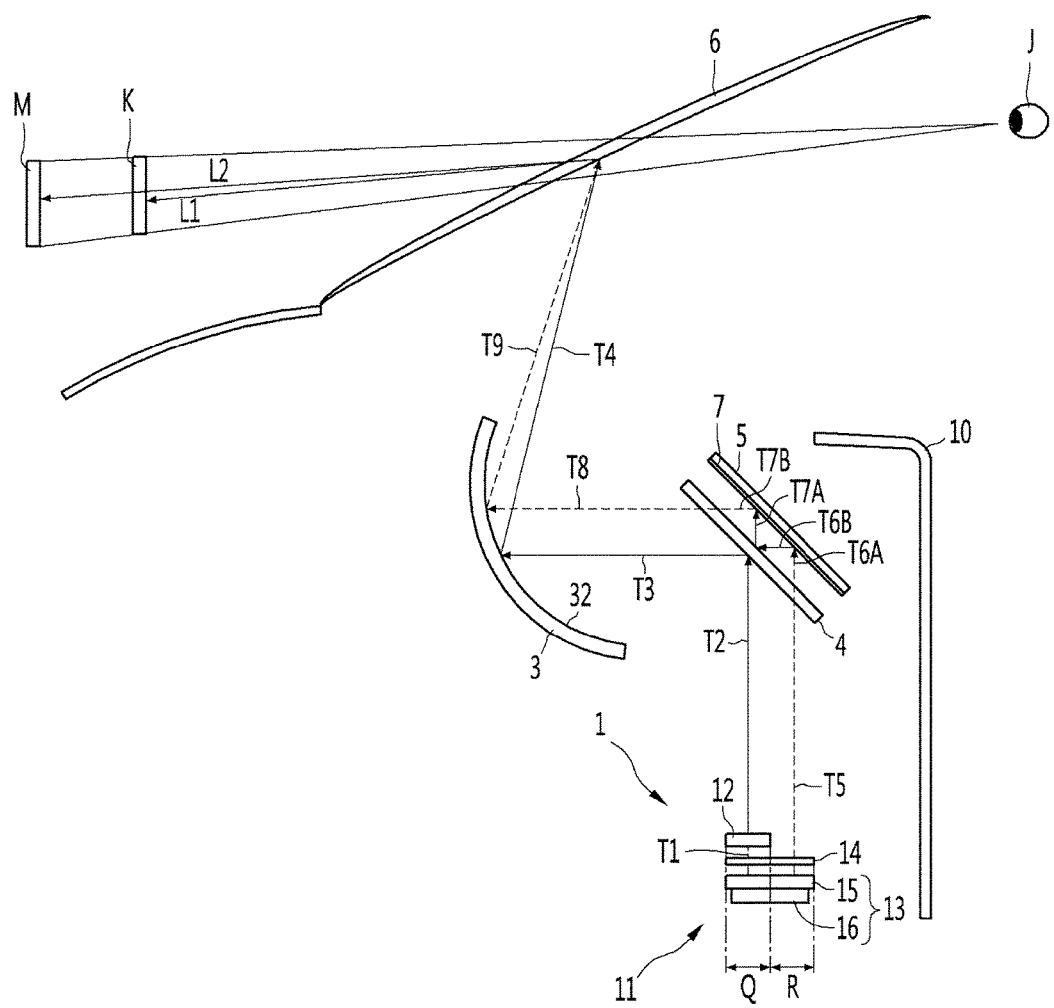
FIG. 6 is a side view illustrating a light path of the head up display for a vehicle according to the third embodiment of the present invention.

Next, FIG. 4 is a side view illustrating a head up display for a vehicle according to a third embodiment of the present invention, FIG. 5 is an expanded side view illustrating a quarter wavelength phase delay unit, a second reflection mirror and a polarizing reflection mirror in FIG. 4, and FIG. 6 is a side view illustrating a light path of the head up display for a vehicle according to the third embodiment of the present invention.

The present embodiment includes a quarter wavelength phase delay unit 7 disposed between the polarizing reflection mirror 4 and the second reflection mirror 5. Other construction and operations are the same or similar as the first and second embodiments of the present invention, and thus the detailed descriptions regarding this are omitted.

In addition, the quarter wavelength phase delay unit 7 may be a quarter wave plate which delays the phase of the linearly polarized light by a quarter wavelength. In more detail, the quarter wavelength phase delay unit 7 may be attached to the surface facing the polarizing reflection mirror 4 on the second reflection mirror 5. For example, the quarter wavelength phase delay unit 7 may also be attached to the front surface 51 of the second reflection mirror 5.

At the time of combination of the quarter wavelength phase delay unit 7 and the second reflection mirror 5, the quarter wavelength phase delay unit 7 and the second reflection mirror 5 convert the linearly polarized light in a first direction transmitted through the polarizing reflection mirror 4 into the linearly polarized light in a second direction and then reflect the linearly polarized light in a second direction.

In the present embodiment, the disposition angle of the image source 11, the half wavelength phase delay unit 12, the first reflection mirror 3, and the polarizing reflection mirror 4 may be same as that of the first embodiment of the present invention, and the position of the image source 11, the half wavelength phase delay unit 12, the first reflection mirror 3, the polarizing reflection mirror 4 and the second reflection mirror 5 may be same as that of the first embodiment of the present invention.

However, in the present embodiment, the distance D2 between the second reflection mirror 5 and the polarizing reflection mirror 4 is shorter than the distance D1 between the second reflection mirror 5 and the polarization reflection mirror 4 in the first and second embodiments.

The combined quarter wavelength phase delay unit 7 and the second reflection mirror 5 functions as a half wavelength phase delay unit which reflects the linearly polarized light while the wavelength of the linearly polarized light incident is converted by half of a wavelength. Thus, the linearly polarized light can be reflected a plurality of times at the polarizing reflection mirror 4 and the second reflection mirror 5, and the space between the polarizing reflection mirror 4 and the second reflection mirror 5 can be reduced.

Further, the second reflection mirror 5 may include a transparent plate 5A and a reflection layer 5B formed on the rear surface of the transparent plate 5A. The distance between the second reflection mirror 5 and the quarter wavelength phase delay unit 7 is also preferably as close as possible. For example, the second reflection mirror 5 and the quarter wavelength phase delay unit 7 are preferably integrated.

In addition, the quarter wavelength phase delay unit 7 can be attached to the front surface 51 of the second reflection mirror 5 using an adhesive 72. A rear surface 73 of the quarter wavelength phase delay unit 7 can also be attached to the front surface 51 of the transparent plate 5A using an adhesive, particularly a transparent adhesive. Further, a front surface 74 of the quarter wavelength phase delay unit 7 faces and is spaced apart from the polarizing reflection mirror 4.

In the present embodiment, the short distance light path is the same as that of the first or second embodiment. Accordingly, the detailed description of the short distance light path is omitted. In the present embodiment, a portion path of the long distance light path is different from that of the first or second embodiment and the other paths are the same as that of the first or second embodiment.

In addition, the fifth path T5, the eighth path T8, and the ninth path T9 among the long distance light paths according to the present embodiment are the same as that of the first embodiment. The sixth paths T6A and T6B among the long distance light path of the present embodiment are different from the sixth path T6 of the first embodiment. Further, the seventh paths T7A and T7B among the long distance light path of the present embodiment are different from the seventh path T7 of the first embodiment.

Also, in the sixth paths T6A and T6B of the present embodiment, the linearly polarized light in a first direction transmitted through the polarizing reflection mirror 4 is converted into a circularly polarized light by the quarter wavelength phase delay unit 7. In addition, the sixth paths T6A and T6B of the present embodiment include a path T6A incident on the second reflection mirror 5 and a path T6B in which the circularly polarized light incident on the second reflection mirror 5 is reflected to the quarter wavelength phase delay unit 7 by the second reflection mirror 5, is converted the linearly polarized light in a second direction by the quarter wavelength phase delay unit 7 and then is incident on the polarizing reflection mirror 4.

Meanwhile, the seventh paths T7A and T7B include a path T7A in which the linearly polarized light in a second direction incident to the polarizing reflection mirror 4 from the quarter wavelength phase delay unit 7 is reflected to the quarter wavelength phase delay unit 7 by the polarizing reflection mirror 4, is converted into the circularly polarized light by the quarter wavelength phase delay unit 7 and then is incident on the second reflection mirror 5. The seventh paths T7A and T7B further include a path T7B in which the circularly polarized light incident on the second reflection mirror 5 from the quarter wavelength phase delay unit 7 is reflected to the quarter wavelength phase delay unit 7 by the second reflection mirror 5, is converted the linearly polarized light in a first direction by the quarter wavelength phase delay unit 7 and then is incident on the polarizing reflection mirror 4.

In the present embodiment, the wavelength of the linearly polarized light transmitting through the polarizing reflection mirror 4 is converted between the polarizing reflection mirror 4 and the second reflection mirror 5 and thus can be reflected in a zigzag shape. Further, the linearly polarized light transmitting through the polarizing reflection mirror 4 is reflected one time between the polarizing reflection mirror 4 and the second reflection mirror 5 by the polarizing reflection mirror 4, is reflected two times by the second reflecting mirror 5 and thus is reflected a total of three times. In the present embodiment, the second reflecting mirror 5 is positioned more closely to the polarizing reflection mirror 4 than in the first embodiment of the present invention by the three times of reflections.

In other words, in the present embodiment, the distance between the polarizing reflection mirror 4 and the second reflection mirror 5 is decreased by the quarter wavelength phase delay unit 7, and has a more compact size than in the first embodiment of the present invention. Hereinafter, the operation of the present invention will be described. The P-wave linearly polarized light P emitted from the image source 11 is described as an example.

A portion of the P-wave linearly polarized light P emitted from the image source 11 is converted into the S-wave linearly polarized light S by the half wavelength phase delay unit 12 and then proceeds to the polarizing reflection mirror 4, and the S-wave linearly polarized light S incident on the front side 41 of the polarizing reflection mirror 4 is reflected to the first reflection mirror 3 by the polarizing reflection mirror 4 and reflected to the windshield 6 by the first reflection mirror 3. In this instance, the driver can view the first virtual image K formed by the short distance light path through the windshield 6.

The rest of the P-wave linearly polarized light P emitted from the image source 11 proceeds to the polarizing reflection mirror 4 with the wavelength thereof not converted, and the P-wave linearly polarized light P incident on the front surface of the polarizing reflection mirror 4 transmits through the polarizing reflection mirror 4 and proceeds to the second reflection mirror 5.

In addition, the P-wave linearly polarized light P emitted toward the second reflection mirror 5 from the polarizing reflection mirror 4 is converted into the circularly polarized light by the quarter wavelength phase delay unit 7 and then is reflected to the quarter wavelength phase delay unit 7 by the second reflection mirror 5. Subsequently, the S-wave linearly polarized light S is emitted toward the polarizing reflection mirror 4 from the quarter wavelength phase delay unit 7.

The S-wave linearly polarized light S emitted toward the polarizing reflection mirror 4 from the quarter wavelength phase delay unit 7 does not transmit through the polarizing reflection mirror 4 and is reflected toward the second reflection mirror 5 from the rear surface of the polarizing reflection mirror 4. Also, the S-wave linearly polarized light S reflected toward the second reflection mirror 5 from the polarizing reflection mirror 4 is converted into the circularly polarized light by the quarter wavelength phase delay unit 7 and then reflects to the quarter wavelength phase delay unit 7 by the second reflection mirror 5. Subsequently, the P-wave linearly polarized light S proceeds to the polarizing reflection mirror 4 from the quarter wavelength phase delay unit 7.

The P-wave linearly polarized light S emitted from the quarter wavelength phase delay unit 7 to the polarizing reflection mirror 4 transmits through the polarizing reflection mirror 4 and then proceeds to the first reflection mirror 3, and the P-wave linearly polarized light P which proceeds to the first reflection mirror 3 is reflected to the windshield 6 by the first reflection mirror 3. In this instance, the driver can recognize the second virtual image formed by the long distance light path.

Thus, the head up display for a vehicle forms two virtual images K and M of which the distances from the windshield 6 are different from each other and the eyes J of the driver can recognize both the first virtual image K formed by the short distance light path and the second virtual image M by the long distance light path through the windshield 6.

As discussed above, an example in which the S-wave linearly polarized light S is emitted from the image source 11 is the same as the example in which the P-wave linearly polarized light P is emitted from the image source 11 except for the type of the linearly polarized light and their operations are same.

Figure 7:
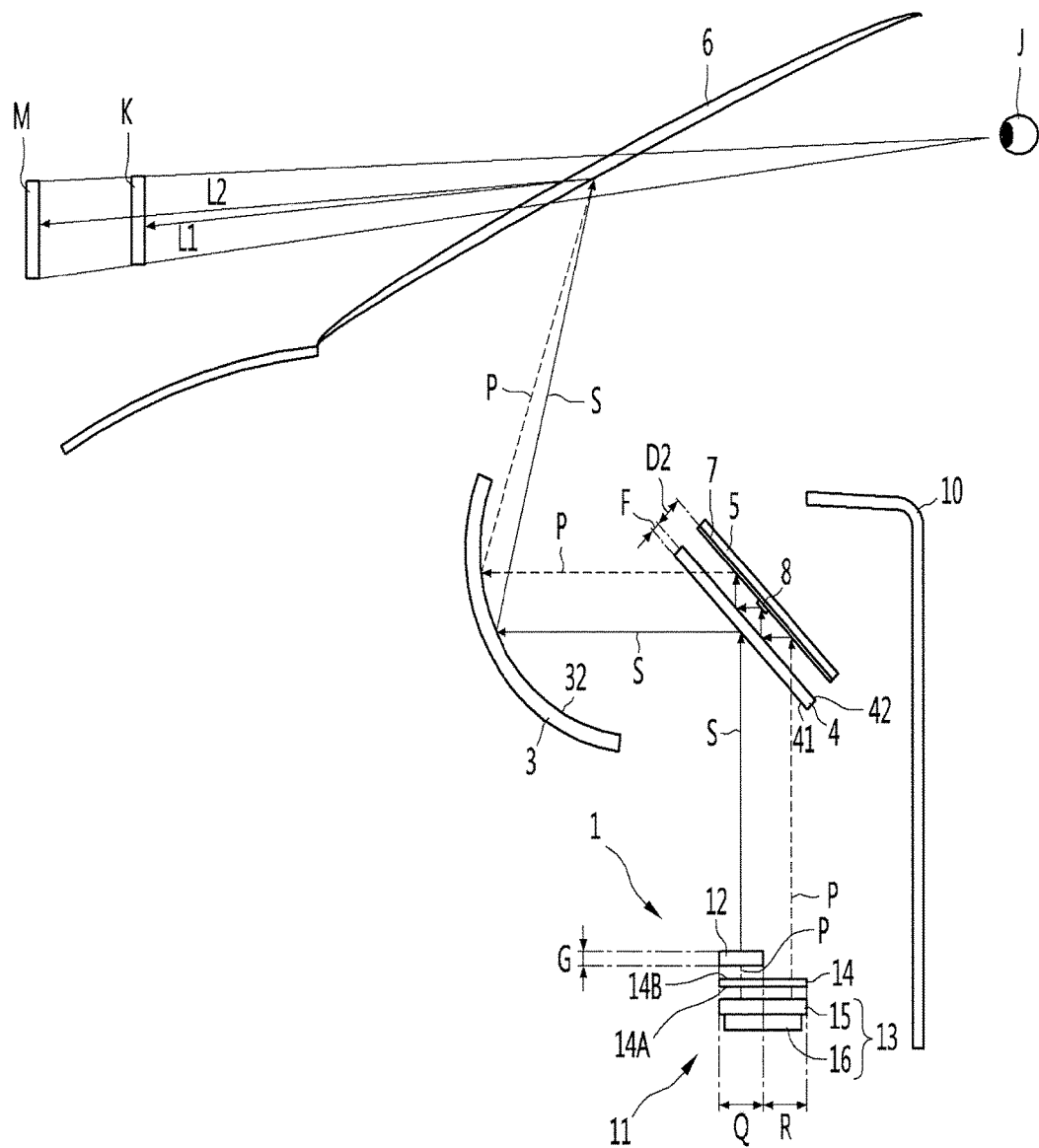
FIG. 7 is a side view illustrating a head up display for a vehicle according to a fourth embodiment of the present invention.
Figure 8:
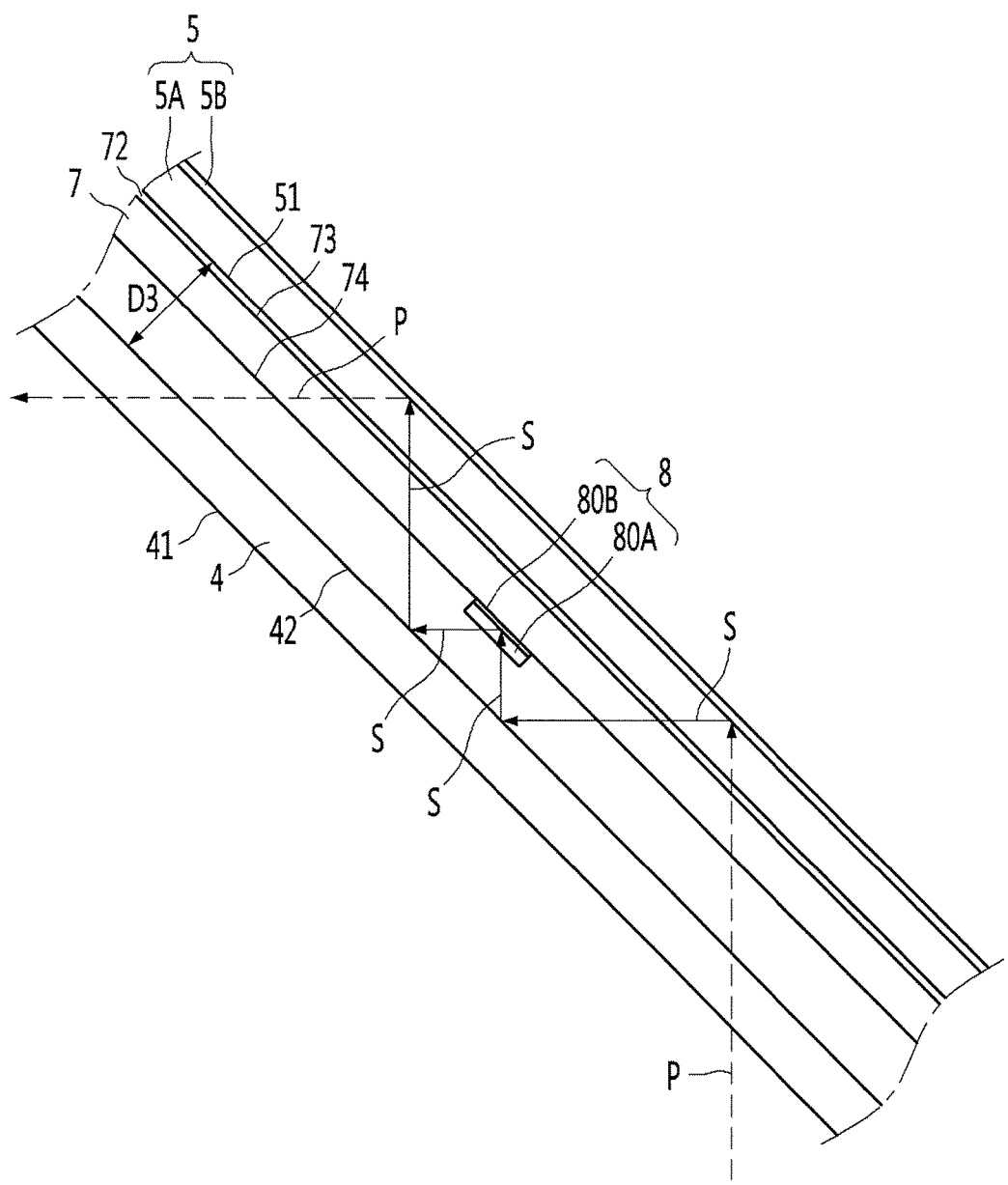
FIG. 8 is an expanded side view illustrating a quarter wavelength phase delay unit, a second reflection mirror, a polarizing reflection mirror and a third reflection mirror in FIG. 7.

Next, FIG. 7 is a side view illustrating a head up display for a vehicle according to a fourth embodiment of the present invention, and FIG. 8 is an expanded side view illustrating a quarter wavelength phase delay unit, a second reflection mirror, a polarizing reflection mirror and a third reflection mirror in FIG. 7.

As illustrated in FIGS. 7 and 8, the present embodiment further includes a third reflection mirror 8 disposed on a portion of the front surface of the quarter wavelength phase delay unit 7. The other construction and the operation thereof other than the third reflection mirror 8 is the same or similar to the third embodiment of the present invention. Thus, the same reference numerals are used and the corresponding detailed description is omitted.

In more detail, the third reflection mirror 8 reflects the light reflected from the polarizing reflection mirror 4 back to the polarizing reflection mirror 4 again. In addition, the third reflection mirror 8 faces the polarizing reflection mirror 4 and is spaced apart from the polarizing reflection mirror 4. Also, the third reflection mirror 8 can be attached to the front surface of the quarter wavelength phase delay unit 7. For example, the third reflection mirror 8 can be attached to the front surface of the quarter wavelength phase delay unit 7 to be spaced apart from the polarizing reflection mirror 4.

Further, the third reflection mirror 8 can be a flat mirror attached to the front surface of the quarter wavelength phase delay unit 7 and include a transparent plate 80A and a reflection layer 80B formed on the rear surface of the transparent plate 80A. The third reflection mirror 8 can also be attached to the front surface of the quarter wavelength phase delay unit 7 by an adhesive, and the reflection layer 80B of the third reflection mirror 8 can be attached to the front surface of the quarter wavelength phase delay unit 7.

In addition, the size of the third reflection mirror 8 can be smaller than the size of the front surface of the quarter wavelength phase delay unit 7 and the second reflection mirror 5. The present embodiment includes the quarter wavelength phase delay unit 7, the second reflection mirror 5, and the third reflection mirror 8 as one mirror assembly.

In more detail, the mirror assembly includes a reflection area in which the third reflection mirror 8 is positioned and a wavelength conversion and reflection area in which the third reflection mirror 8 is not positioned. The reflection area is the first area which totally reflects the linearly polarized light reflected from the polarizing reflection mirror 4 back to the polarizing reflection mirror 4 without wavelength conversion.

In addition, the wave conversion and reflection area may also be the second area in which the linearly polarized light reflected from the polarizing reflection mirror 4 transmits through the quarter wavelength phase delay unit 7 and then is reflected again to the polarizing reflection mirror 4 from the second reflection mirror 5.

With reference to FIGS. 7 and 8, the operation of the present embodiment will be described in more detail. Again, the P-wave linearly polarized light P is emitted from the image source 11 will be described as example.

The P-wave linearly polarized light P emitted from the image source 11 and then transmitted through the polarizing reflection mirror 4 proceeds to the second reflection mirror 5, is converted into the circularly polarized light by the quarter wavelength phase delay unit 7 and then reflects to the quarter wavelength phase delay unit 7 by the second reflection mirror 5. Subsequently, the S-wave linearly polarized light S is emitted toward the polarizing reflection mirror 4 from the quarter wavelength phase delay unit 7 as in the third embodiment of the present invention.

Further, the S-wave linearly polarized light S emitted toward the polarizing reflection mirror 4 from the quarter wavelength phase delay unit 7 does not transmit through the polarizing reflection mirror 4 and is reflected from the rear surface of the polarizing reflection mirror 4, as in the third embodiment of the present invention. As illustrated in FIG. 8, the S-wave linearly polarized light S reflected from the polarizing reflection mirror 4 is incident on the third reflection mirror 8 of the present embodiment and is then totally reflected to the polarizing reflection mirror 4 by the third reflection mirror 8.

In addition, the S-wave linearly polarized light S reflected to the polarizing reflection mirror 4 by the third reflection mirror 8 does not transmit through the polarizing reflection mirror 4 and is reflected toward the second reflection mirror 5 from the rear surface of the polarizing reflection mirror 4. The S-wave linearly polarized light S reflected toward the second reflection mirror 5 from the rear surface of the polarizing reflection mirror 4 is converted into the circularly polarized light by the quarter wavelength phase delay unit 7 and then is reflected to the quarter wavelength phase delay unit 7 by the second reflection mirror 5. Subsequently, the P-wave linearly polarized light S is emitted from the quarter wavelength phase delay unit 7 and proceeds to the polarizing reflection mirror 4, as in the third embodiment of the present invention.

Also, the P-wave linearly polarized light P emitted from the quarter wavelength phase delay unit 7 to the polarizing reflection mirror 4 transmits through the polarizing reflection mirror 4 and then proceeds to the first reflection mirror 3 and the P-wave linearly polarized light P which proceeds to the first reflection mirror 3 is reflected to the windshield 6 by the first reflection mirror 3, as in the third embodiment of the present invention. In this instance, the driver can recognize the second virtual image formed by the long distance light path.

In the present embodiment, the second virtual image M is formed at the farther distance than in the third embodiment of the present invention. The present embodiment further includes a light path from the rear surface of the polarizing reflection mirror 4 to the third reflection mirror 8 and a light path from the third reflection mirror 8 to the rear surface of the polarizing reflection mirror 4. Also, the second virtual image M in the present embodiment forms at the farther distance than in the third embodiment of the present invention by the two light paths.

In addition, assuming that the distance in which the second virtual image M in the third embodiment of the present invention is the same as that in the present invention, the distance D3 between the polarizing reflection mirror 4 and the second reflection mirror 5 is shorter than the distance D2 between the polarizing reflection mirror 4 and the second reflection mirror 5 in the third embodiment of the present invention. In this instance, the width in the longitudinal direction of the head up display for a vehicle is shorter than that in the third embodiment of the present invention.

Figure 9:
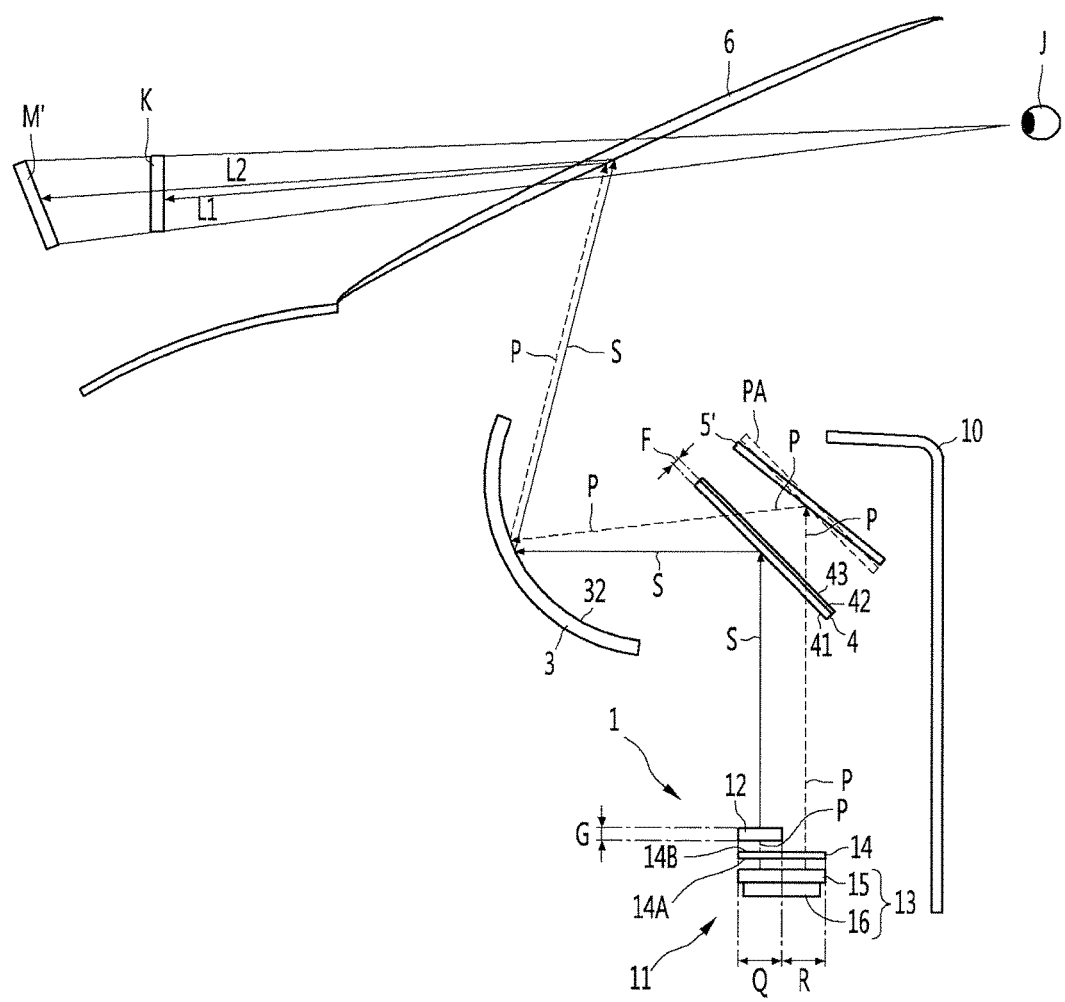
FIG. 9 is a side view illustrating a head up display for a vehicle according to a fifth embodiment of the present invention.

Next, FIG. 9 is a side view illustrating a head up display for a vehicle according to a fifth embodiment of the present invention. In the present embodiment, the second reflection mirror 5' is inclined with respect to the polarizing reflection mirror 4. Since the other construction and the operation thereof are same or similar to those of any one of the first embodiment to the third embodiment of the present invention, the same numeral references are used.

As shown, the front surface of the second reflection mirror 5' is installed to face the rear surface 42 of the polarizing reflection mirror 4 and the second reflection mirror 5' is disposed not to be parallel to the polarizing reflection mirror 4. Further, the second reflection mirror 5' is disposed so that an extension line of the second reflection mirror 5' in the longitudinal direction and the extension line of the polarizing reflection mirror 4 in the longitudinal direction intersect with each other.

In this instance, the second reflection mirror 5' reflects the first linearly polarized light toward the polarizing reflection mirror 4 in an inclined manner and the first linearly polarized light incident on the polarizing reflection mirror 4 from the second reflection mirror 5' in an inclined manner transmits through the polarizing reflection mirror 4 and then is reflected from the first reflection mirror 3 to the windshield 6. The second virtual image M' which is positioned in the second position from the windshield 6 inclines by a predetermined angle compared to when the second reflection mirror 5' and the polarizing reflection mirror 4 are parallel to each other.

Figure 10:
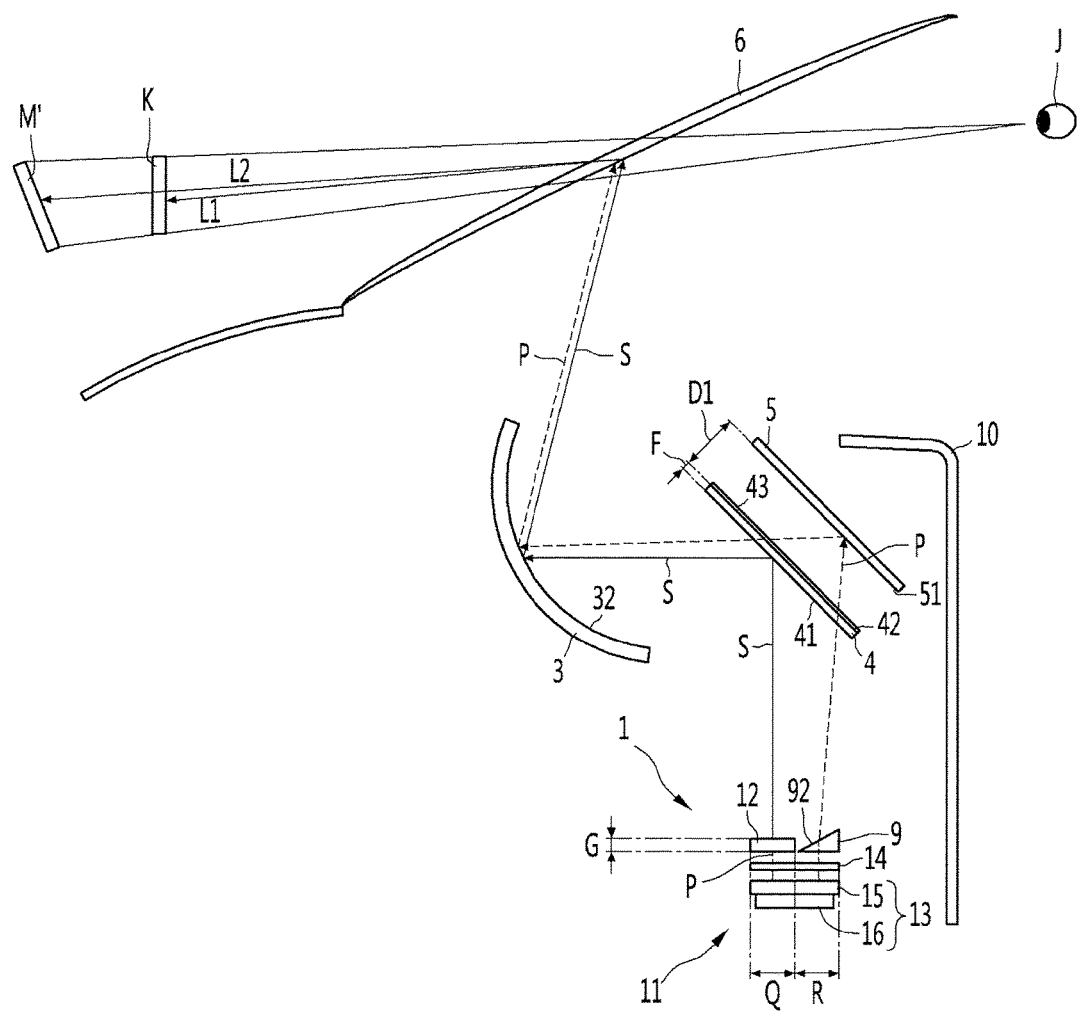
FIG. 10 is a side view illustrating a head up display for a vehicle according to a sixth embodiment of the present invention.

Next, FIG. 10 is a side view illustrating a head up display for a vehicle according to a sixth embodiment of the present invention. The half wavelength phase delay unit 12 of the present embodiment is disposed to face a portion of the emitting surface of the image source 11 and the present embodiment further includes a prism 9 disposed between the image source 11 and the polarizing reflection mirror 4. Since the other construction other than the prism 9 and the operation thereof are same or similar to those of any one of the first embodiment or the third embodiment of the present invention, the same numeral references are used.

In addition, the prism 9 refracts the first linearly polarized light emitted toward the portion other than the half wavelength phase delay unit 12 from the image source 11. The half wavelength phase delay unit 12 and the prism 9 are disposed in the longitudinal direction.

The prism 9 is spaced apart from the polarizing reflection mirror 4 in the vertical direction. The prism 9 emits the light in a direction that the linearly polarized light in a first direction is away from the linearly polarized light in a second direction emitted from the half wavelength phase delay unit 12. Further, the prism 9 includes a light emitting surface 92 inclined in the direction opposite to the front surface 41 of the polarizing reflection mirror 4.

The linearly polarized light in a first direction is bent in a direction that the linearly polarized light in a first direction emitted from the image source 11 transmits through the prism 9 and then is away from the linearly polarized light in a second direction emitted from the half wavelength phase delay unit 12, and is incident on the polarizing reflection mirror 4 and then transmits through the polarizing reflection mirror 4.

In addition, the linearly polarized light in a first direction transmitting through the polarizing reflection mirror 4 is reflected by the second reflection mirror 5 and then transmits through the polarizing reflection mirror 4 and is reflected to the windshield 6 by the first reflection mirror 3. In this instance, the second virtual image M' formed by the long distance light path inclines by a predetermined angle compared to when the prism 9 is not provided.

Figure 11:
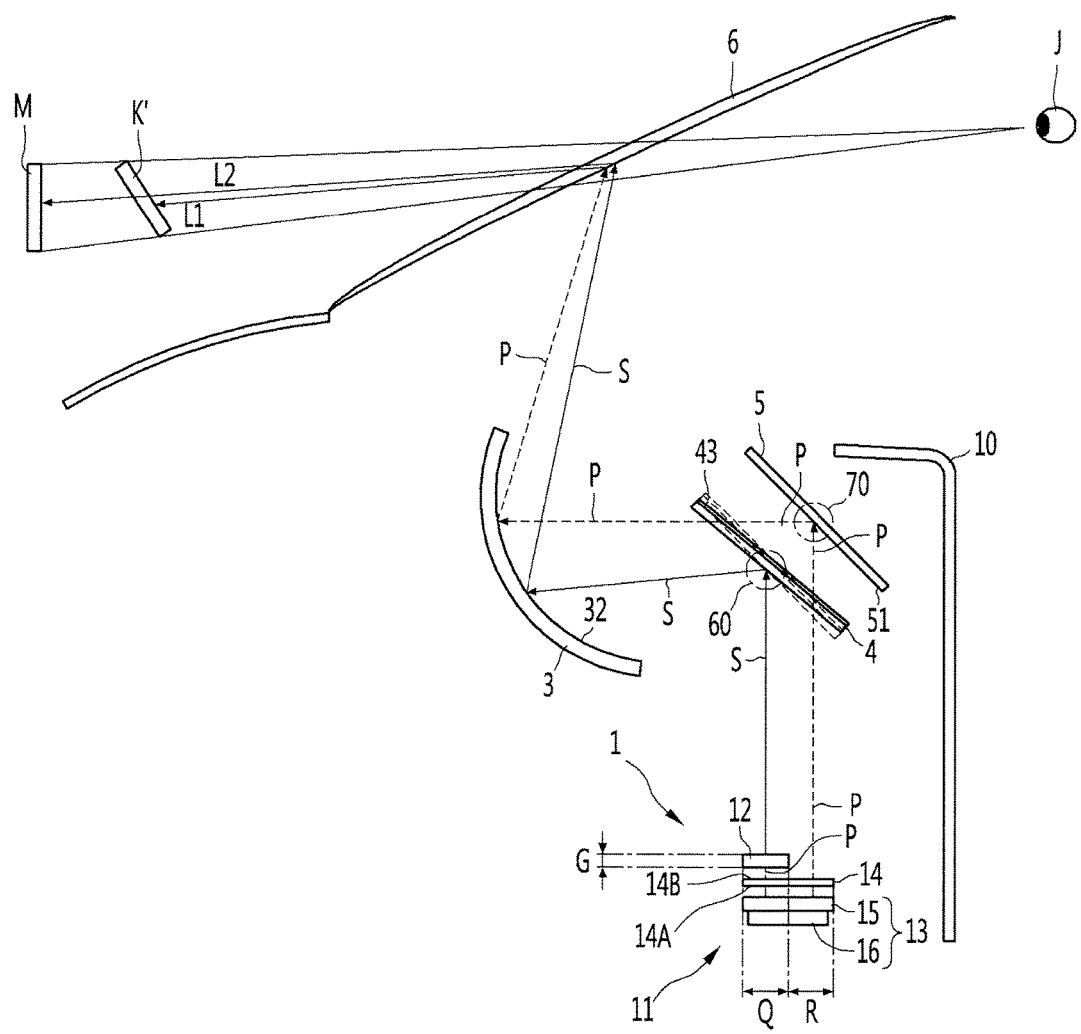
FIG. 11 is a side view illustrating when a first virtual image is inclined when a polarizing reflection mirror of a head up display for a vehicle according to a seventh embodiment of the present invention is rotated.
Figure 12:
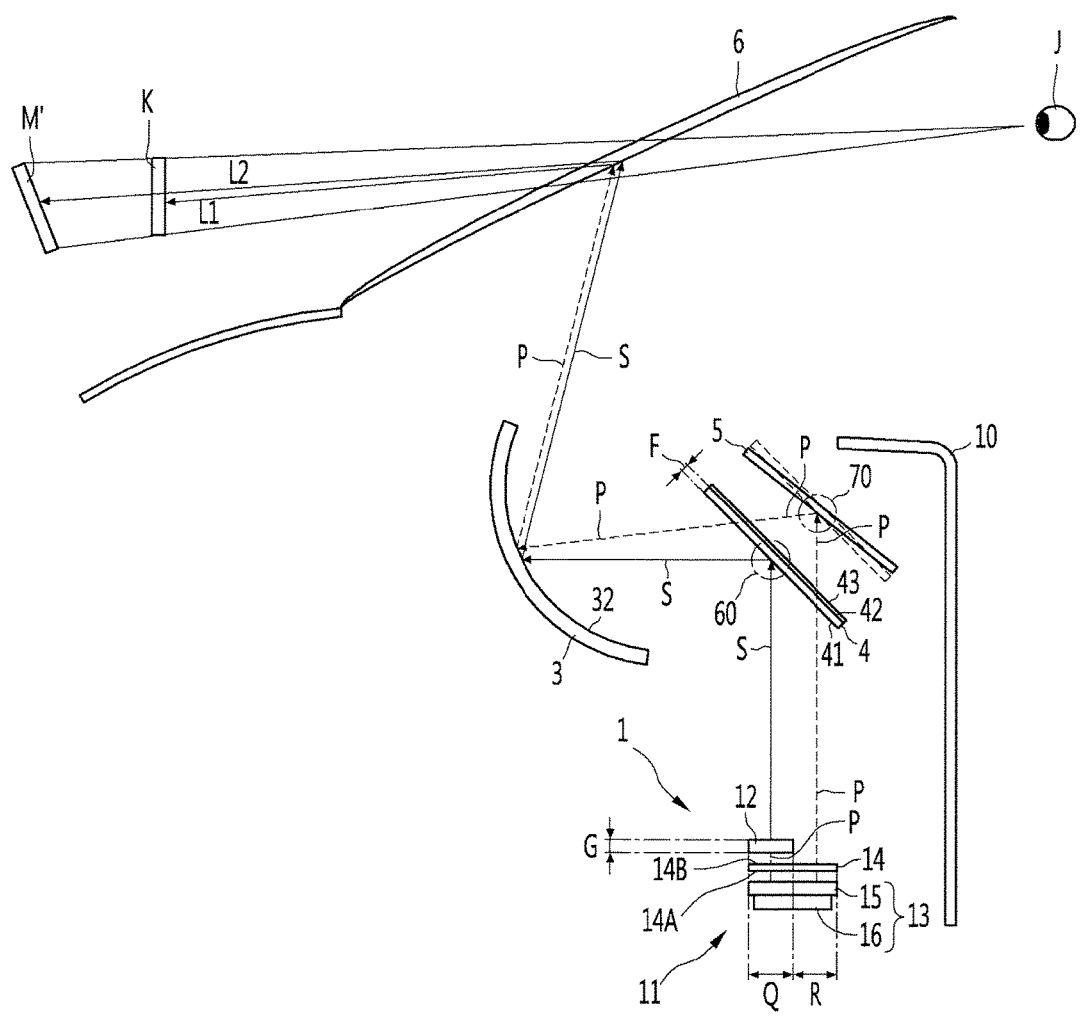
FIG. 12 is a side view illustrating when a second virtual image is inclined when a second reflection mirror of a head up display for a vehicle according to the seventh embodiment of the present invention is rotated.

Next, FIG. 11 is a side view illustrating when a first virtual image is inclined when a polarizing reflection mirror of a head up display for a vehicle according to a seventh embodiment of the present invention is rotated, and FIG. 12 is a side view illustrating when a second virtual image is inclined when a second reflection mirror of a head up display for a vehicle according to a seventh embodiment of the present invention is rotated.

The present embodiment may further include at least one rotating device for rotating at least one of the polarizing reflection mirror 4 and the second reflection mirror 5. The rotating device may include a first rotating device 60 and a second rotating device 70. In more detail, the present embodiment further includes the first rotating device 60 for rotating any one of the polarizing reflection mirror 4 and the second reflection mirror 5. The present embodiment also includes the second rotating device 70 for rotating the other one of the polarizing reflection mirror 4 and the second reflection mirror 5.

In the present embodiment, when only the first rotating device 60 is included and the second rotating device 70 is not included, the head up display for a vehicle adjusts only the inclination of the first virtual image K and K' and does not adjust the inclination of the second virtual image M and M'. In addition, in the present embodiment, when only the second rotating device 70 is included and the first rotating device 60 is not included, the head up display for a vehicle adjusts only the inclination of the second virtual image M and M' and does not adjust the inclination of the first virtual image K and K'.

However, in the present embodiment, both the first rotating device 60 and the second rotating device 70 may be included. In this instance, the inclination of the first virtual image K and K' can be adjusted by the first rotating device 60 and the inclination of the second virtual image M and M' can be adjusted by the second rotating device 70.

Hereinafter, for convenience of the description, the present embodiment describes an example including both the first rotating device 60 and the second rotating device 70. In particular, the first rotating device 60 may be a polarizing reflection mirror rotating device which is connected to one side of the polarizing reflection mirror 4 and allows the polarizing reflection mirror 4 to be rotated.

In addition, the first rotating device 60 may include a motor and a rotating shaft of the motor connected to the rotating center of the polarizing reflection mirror 4. Accordingly, it is possible to directly rotate the polarizing reflection mirror 4. Further, the first rotating device 60 may include a motor and a power transmission member connected to the motor and is connected to the rotating shaft of the polarizing reflection mirror 4. Accordingly, it is possible to rotate the polarizing reflection mirror 4 through the power transmission member.

At the time of rotating the polarizing reflection mirror 4, the first rotating device 60 preferably rotates the polarizing reflection mirror 4 in an angle which is not in contact with the second reflection mirror 5. Also, the first rotating device 60 rotates the polarizing reflection mirror 4 in the clockwise direction or the counterclockwise direction by a predetermined angle. The polarizing reflection mirror 4 can also be inclined to the second reflection mirror 5 by a predetermined angle as illustrated in FIG. 11 from being parallel to the second reflection mirror 5 as illustrated in FIG. 1.

At the time of rotating the polarizing reflection mirror 4, the reflection angle of the polarizing reflection mirror 4 is changed, and as illustrated in FIG. 11, the first virtual image K' formed at the short distance L1 from the windshield 6 is inclined by a predetermined angle. In addition, the first rotating device 60 rotates the polarizing reflection mirror 4 parallel to the second reflection mirror 5 in the reverse direction. In this instance, as illustrated in FIG. 1, the first virtual image K positioned at the long distance from the windshield 6 is in a upright state.

The second rotating device 70 may be a second reflection mirror rotating device which is connected to one side of the second reflection mirror 5 and allows the second reflection mirror 5 to be rotated. The second rotating device 70 may also include a motor and a rotating shaft of the motor connected to the rotating center of the second reflection mirror 5.

Accordingly, it is possible to directly rotate the second reflection mirror 5. The second rotating device 70 may include a motor and a power transmission member which is connected to the motor and is connected to the rotating shaft of the second reflection mirror 5. Accordingly, it is possible to rotate the second reflection mirror 5 through the power transmission member.

At the time of rotating the second reflection mirror 5, the second rotating device 70 preferably rotates the second reflection mirror 5 in an angle which is not in contact with the polarizing reflection mirror 4. Further, the second rotating device 70 rotates the second reflection mirror 5 in the clockwise direction or the counterclockwise direction by a predetermined angle. The second reflection mirror 5 can also be inclined with respect to the polarizing reflection mirror 4 by a predetermined angle as illustrated in FIG. 12 from being parallel to the polarizing reflection mirror 4 as illustrated in FIG. 1.

At the time of rotating the second reflection mirror 5, the reflection angle of the second reflection mirror 5 is changed, and as illustrated in FIG. 12, the second virtual image M' formed at the long distance L2 from the windshield 6 may be inclined by a predetermined angle. In addition, the second rotating device 70 rotates the second reflection mirror 5 parallel to the polarizing reflection mirror 4 in the reverse direction. In this instance, as illustrated in FIG. 1, the second virtual image M positioned at the long distance from the windshield 6 is in a upright state.

Figure 13:
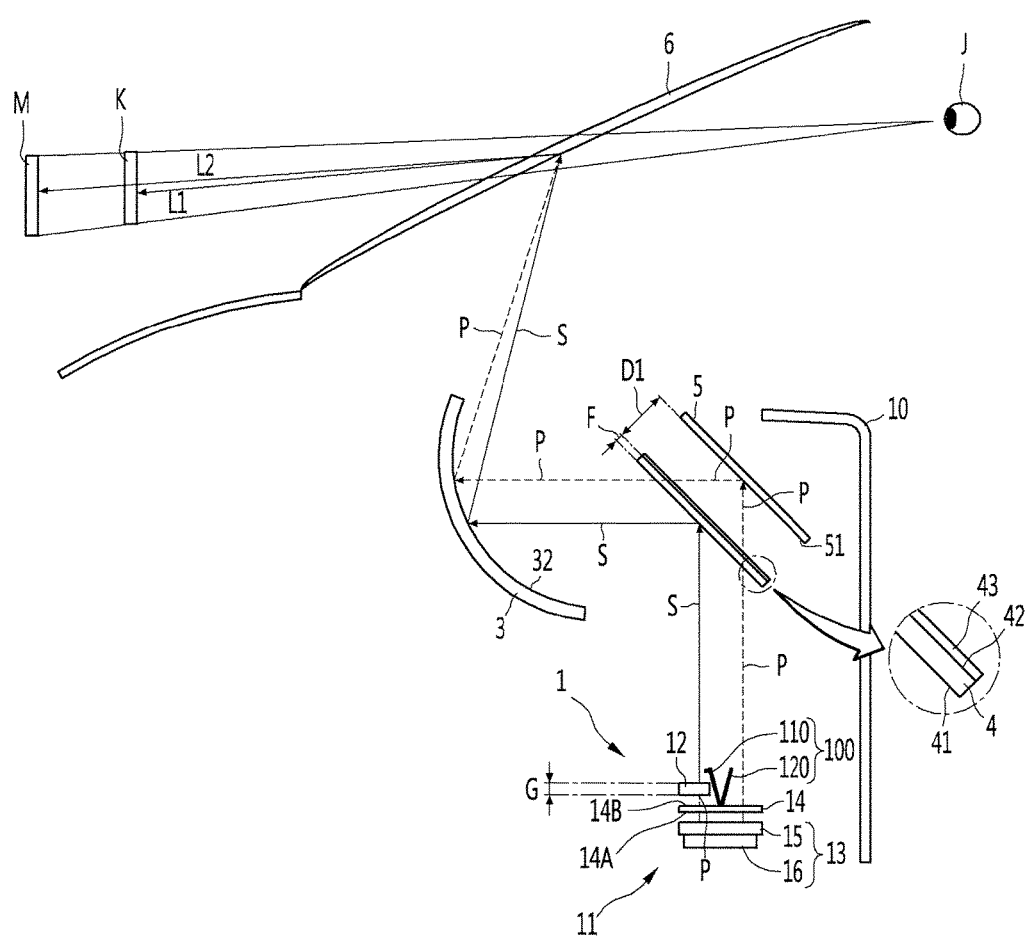
FIG. 13 is a side view illustrating a main configuration of a head up display for a vehicle according to an eighth embodiment of the present invention.
Figure 14:
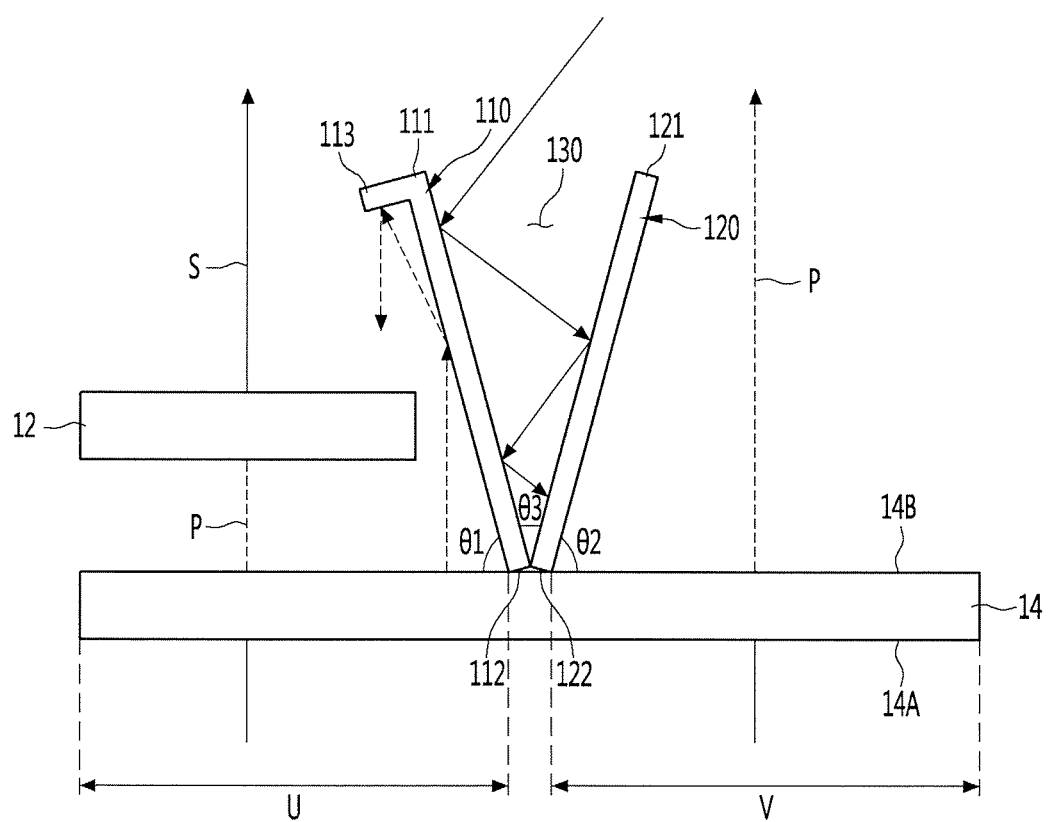
FIG. 14 is an enlarged side view illustrating a linear polarizer, a half wavelength half delay unit, and a separation barrier illustrated in FIG. 13.
Figure 15:
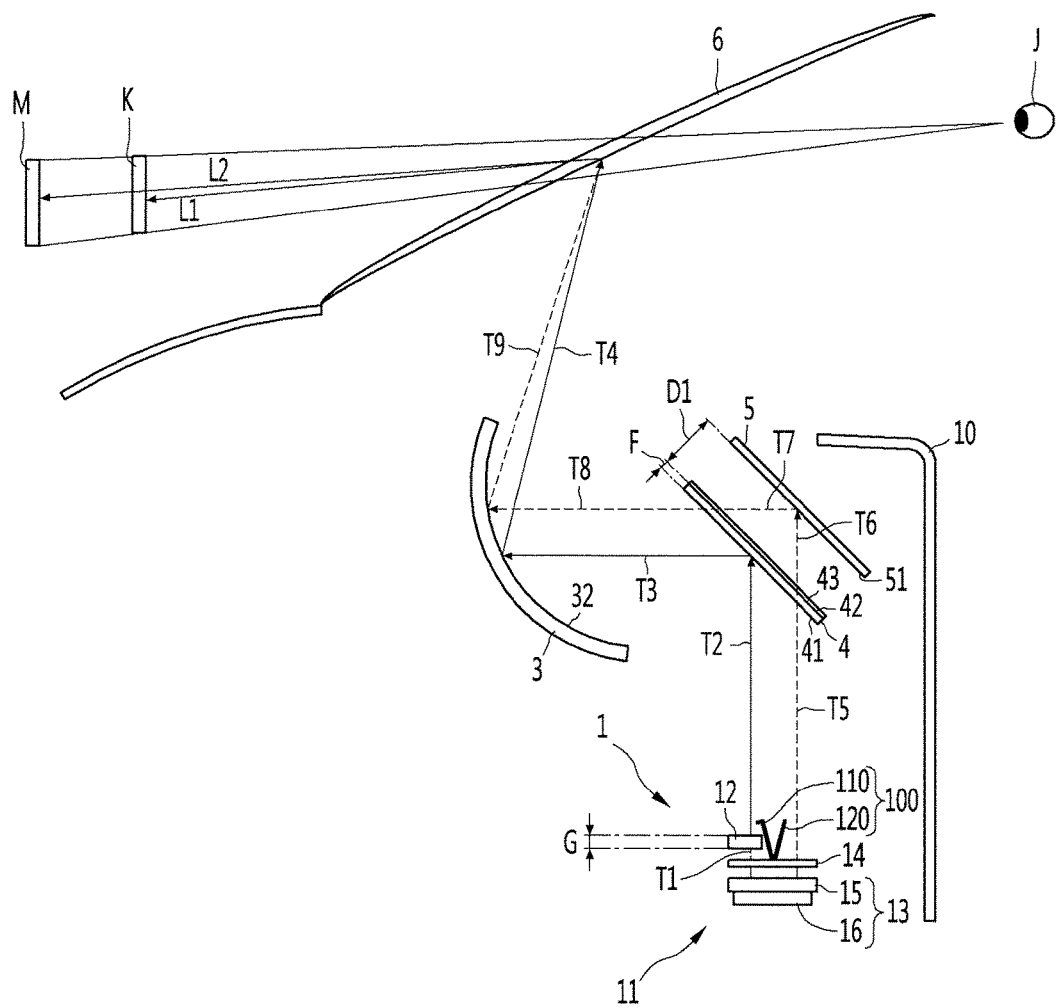
FIG. 15 is a side view illustrating an optical path of the head up display for the vehicle according to the eighth embodiment of the present invention.

Next, FIG. 13 is a side view illustrating a main configuration of a head up display for a vehicle according to an eighth embodiment of the present invention, FIG. 14 is an enlarged side view illustrating a linear polarizer, a half wavelength half delay unit, and a separation barrier illustrated in FIG. 13, and FIG. 15 is a side view illustrating an optical path of the head up display for the vehicle according to the eighth embodiment of the present invention.

With reference to FIGS. 13 to 15, the imaging device 1 of the present embodiment may further include a separation barrier 100 for improving the image quality of the virtual images K and M and since other configurations and operations other than the separation barrier 100 are the same as or similar to those of the first embodiment of the present invention, the same reference numerals are used and a detailed description thereof will be omitted.

In addition, the imaging device 1 of the present embodiment may further include a separation barrier 100. The separation barrier 100 can improve the image quality of the image light emitted from the head up display for the vehicle to the windshield 6 of the vehicle. More specifically, the separation barrier 100 prevents each of the virtual images K and M formed by the image light from overlapping or interfering with each other and can removes unnecessary peripheral images of each of the virtual images K and M.

Further, the separation barrier 100 can prevent mutual interference between the linearly polarized light in the first direction and the linearly polarized light in the second direction which are emitted from the imaging device 1. The separation barrier 100 can be disposed between the light emitting surface of the image source 11 and one surface 41 of the polarizing reflection mirror 4. More specifically, the separation barrier 100 can be disposed between the light emitting surface 14B of the linear polarizer 14 and one surface 41 of the polarizing reflection mirror 4.

The separation barrier 100 can also be disposed to be in contact with the light emitting surface of the image source 11. More specifically, the separation barrier 100 can be disposed to be in contact with the light emitting surface 14B of the linear polarizer 14. Further, the separation barrier 100 has a predetermined height from the image source 11 in a direction of the polarizing reflection mirror 4. The separation barrier 100 can also be disposed to be upright in an upward direction from the image source 11, and disposed to be inclined at a predetermined angle.

In addition, the half wavelength phase delay unit 12 is positioned on one side of the separation barrier 100 and can be positioned to be spaced apart from the separation barrier 100 or disposed in contact with the separation barrier 100.

The half wavelength phase delay unit 12 and the separation barrier 100 may be disposed in front of and behind each other. Further, the separation barrier 100 can divide the light emitting surface 14B of the linear polarizer 14 into a first light emitting region U and a second light emitting region V. In particular, the first light emitting region U may be a portion of the light emitting surface 14B of the linear polarizer 14, located on one side of the separation barrier 100 and the second light emitting region V may be a portion of the light emitting face 14B of the linear polarizer 14, located on the other side of the separation barrier 100.

The half wavelength phase delay unit 12 may also be disposed so as to face the first light emitting region U of the linear polarizer 14 and face at least a portion of the first light emitting region U. The first light emitting region U may also face the half wavelength phase delay unit 12 and the separation barrier 100 and can also face only the half wavelength phase delay unit 12. The first light emitting region U may also not be exposed in the upper direction and not face the one surface 41 of the polarizing reflection mirror 4.

In addition, the second light emitting region V can face one side 41 of the polarizing reflection mirror 4 and the separation barrier 100, and can face only one surface 41 of the polarizing reflection mirror 4. Further, at least a portion of the linearly polarized light emitted to the first light emitting region U of the linear polarizer 14 can be incident on the half wavelength phase delay unit 12 and be converted by half wavelength. At least a portion of the linearly polarized light emitted to the second light emitting region V of the linear polarizer 14 can also be directed to the polarizing reflection mirror 4 without being incident on the half wavelength phase delay unit 12.

A portion of the linearly polarized light emitted to the first light emitting region U may be blocked or reflected by the separation barrier 100 and thus not be directed to the polarizing reflection mirror 4. In addition, a portion of the linearly polarized light emitted to the second light emitting region V can be blocked or reflected by the separation barrier 100 and thus not be directed to the polarizing reflection mirror 4. In other words, the unnecessary linearly polarized light forming the peripheral image of the virtual image of the linearly polarized light emitted from the image source 11 can be blocked by the separating barrier 100.

The imaging device 1, which is a combination of the image source 11, the half wavelength phase delay unit 12, and the separation barrier 100, can also be a kind of dual linear polarization emitting device which emits two linearly polarized lights having different polarization directions from each other through different regions from each other and prevents the two linearly polarized lights from interfering with each other.

As shown, the separation barrier 100 may include a first barrier 110 and a second barrier 120. The first barrier 110 and the second barrier 120 may be formed of a plate-shaped member, respectively, and may be formed integrally or separately. Further, the length or the height of the first barrier 110 and the second barrier 120 may be different from each other or may be identical to each other.

The half wavelength phase delay unit 12 may be positioned on a side opposite to the second barrier 120 with respect to the first barrier 110. As shown, the first barrier 110 and the second barrier 120 may be disposed at a predetermined angle θ3. That is, each of the barriers 110 and 120 may be disposed at a predetermined angle with respect to the light emitting surface of the image source 11. The barriers 110 and 120 can also be disposed obliquely to the light emitting surface of the image source 11. The light emitting surface of the image source 11 corresponds to the light emitting surface 14B of the linear polarizer 14.

Further, the angles between each of the barriers 110 and 120 and the light emitting surface of the image source 11 can be different from each other. For example, the angle θ1 between the first barrier 110 and the light emitting surface 14B of the linear polarizer 14 may be set to be smaller than the angle θ2 between the second barrier 120 and the light emitting surface 14B of the linear polarizer 14. Alternatively, the second barrier 120 may be disposed to be perpendicular to the light emitting surface 14B of the linear polarizer 14 and the first barrier 110 may be disposed at an acute angle with the light emitting surface 14B of the linear polarizer 14.

Since the half wavelength phase delay unit 12 located in the first light emitting region U, the angle θ1 between the first barrier 110 and the light emitting surface of the image source 11 may be smaller than the angle θ2 between the second barrier 120 and the light emitting surface of the image source 11. Accordingly, the light that does not pass through the half wavelength phase delay unit 12 of the light emitted from the first light emitting region U can be blocked by the first barrier 110.

In addition, the second barrier 120 can be disposed away from the first barrier 110 as the distance between the second barrier 120 and the light emitting surface of the image source 11 is increased. More specifically, the distance between the first barrier 110 and the second barrier 120 can be further increased as the distance between each of the first barrier 110 and the second barrier 120 and the light emitting surface of the image source 11 is increased. For example, the distances between the respective barriers 110 and 120 can be minimum at the end portions 112 and 122 of the barriers 110 and 120 on the image source 11 side and can be maximum at the other end portions 111 and 121 thereof.

Overlapping and interfering of the light emitted from the first light emitting region U and the light emitted from the second light emitting region V with each other can be prevented by a disposition relationship of the first barrier 110 and the second barrier 120 and the reliability of the separation barrier 100 can be improved. Further, the end portions 111 and 121 of both end portions of each of the barriers 110 and 120, away from the image source 11 can be formed in a sharp shape.

The first barrier 110 and the second barrier 120 may also be spaced apart from each other. However, the first barrier 110 and the second barrier 120 are preferably disposed in contact with each other to prevent an unnecessary loss of light emitted from the linear polarizer 14. More specifically, the end portions 112 and 122 of the first barrier 110 and the second barrier 120 on the image source 11 side may be in contact with each other.

One end portions 112 and 122 of each of the barrier walls 110 and 120 may also be disposed to be in contact with the light emitting surface of the image source 11. More specifically, one end portion 112 of the first barrier 110 and one end portion 122 of the second barrier 120 can be in contact with the light emitting surface 14B of the linear polarizer 14.

In addition, the half wavelength phase delay unit 12 can be positioned between both end portions 111 and 112 of the first barrier 110 in a direction parallel to the light emitting surface of the image source 11. For example, the half wavelength phase delay unit 12 may be positioned between both end portions 111 and 112 of the first barrier 110 with respect to the horizontal direction. In this instance, the upper side end portion of the separation barrier 100 can be located above the half wavelength phase delay unit 12. More specifically, the upper side end portion 111 of the first barrier 110 can be located above the half wavelength phase delay unit 12.

Thus, the portion which forms an unnecessary peripheral image of the light whose wavelength is converted at the half wavelength phase delay unit 12 can be blocked. In addition, the upper surface of the separation barrier 100 can be opened. More specifically, a space 130 can be formed between the first barriers 110 and second barriers 120 which is opened to face one side 41 of the polarizing reflection mirror 4. The space 130 thus serves as a light trap.

When an upper surface of the separation barrier 100 is not opened, there is concern that light deviating from the predetermined optical path of the light emitted from the imaging device 1 or external light entering from the outside into the interior of the head up display for the vehicle is reflected from the upper surface of the separation barrier 100, and thus the image quality of each of the images K and M may be decreased or an unnecessary virtual image may be formed.

Thus, the space 130 between the first barrier 110 and the second barrier 120 can trap external light or the like by reflecting the external light or the like from the interior. Accordingly, the image quality of the virtual images K and M is improved and unnecessary virtual images can be prevented from being seen by the user.

In addition, the space 130 between the first barriers 110 and the second barriers 120 can be disposed so as to face a portion on which external light is incident, in order to effectively trap the external light of the head up display. Further, the external light may be sunlight coming in through the windshield 6, and such sunlight may come in from above the first reflection mirror 3. Accordingly, the separation barrier 100 can be arranged such that the space 130 between the first barriers 110 and the second barriers 120 faces the upper side of the first reflective mirror 3.

Alternatively, the separation barrier 100 may be disposed such that the space 130 between the first barrier 110 and the second barrier 120 faces a portion between the first reflection mirror 3 and the polarizing reflection mirror 4. More specifically, the separation barrier 100 can be disposed so that the space 130 between the first barrier 110 and the second barrier 120 faces between a reflective surface 32 of the first reflective mirror 3 and one side 41 of the polarizing reflection mirror 4.

Also, the first barrier 110 and/or the second barrier 120 may be provided with a protrusion portion 113 protruding outwardly. In this instance, the outer side can be a direction toward a side opposite to the space 130 formed between the barriers 110 and 120. Although the protrusion portion 113 may protrude perpendicularly to each of the barriers 110 and 120, this is not limited thereto.

In addition, the protrusion portion 113 may be formed at the end portions 111 and 121 of the first barrier 110 and/or the second barrier 120, which are away from the image source 11. The protrusion portion 113 thus can serve as a light trap and can block unnecessary linearly polarized light which forms a peripheral image of a virtual image of the linearly polarized light emitted from the image source 11.

The protrusion portion 113 formed on the first barrier 110 may also protrude toward the first light emitting region U. In other words, the protrusion portion 113 formed on the first barrier 110 can protrude toward the half wavelength phase delay unit 12.

In addition, there is a concern that a portion of the linearly polarized light in the first direction emitted from the first light emitting region U of the linear polarizer 14 is not converted into the linearly polarized light in the second direction at the polarizing reflection mirror 12, but directly directed to the polarizing reflection mirror 4, by a gap between the half wavelength phase delay unit 12 and the first barrier 110. The protrusion portion 113 can thus serve to block linearly polarized light in the first direction.

Since the half wavelength phase delay unit 12 is not disposed in the second light emitting region V, there is less concern that the concern described above is generated. Therefore, the second barrier 120 may not have a protrusion portion. However, preferably, not only the first barrier 110 but also the second barrier 120 is provided with a protrusion portion when a separate optical element is disposed in the second light emitting region V.

According to the embodiments of the present invention, the head up display for a vehicle is made more compact and minimized in size thereof than when light is simply sequentially reflected from a plurality of reflecting mirrors by a linear polarizing light selectively transmitted through/reflected from a polarizing reflection mirror.

Further, the linearly polarized light in a first direction emitted from the image source forms two virtual images of which distances from the windshield are different from each other by four optical structures including the half wavelength phase delay unit, the polarizing reflection mirror, the first reflection mirror, and the second reflection mirror and thus the present embodiments have an advantage that the number of components for forming the two virtual images of which distances from the windshield are different from each other is minimized.

In addition, the distance between the polarizing reflection mirror and the second reflection mirror can be minimized by the phase delay unit and thus the present invention has an advantage that the head up display is more compact. Further, the phase delay unit is attached to the front surface of the second reflection mirror and thus the installation of the phase delay unit and the second reflection mirror is simpler and when the phase delay unit and the second reflection mirror are spaced apart from each other, the present invention has an advantage that the head up display is more compact.

Further, the head up display according to an embodiment of the present invention has advantages of forming the inclined second virtual image using a simple structure and the stereoscopic effect is increased.

In addition, there is an advantage that the light that forms the first virtual image and the second virtual image is not overlapped or interfered with each other by the separation barrier and thus the image quality of each virtual image is improved. Further, unnecessary peripheral images of each of the virtual images can be blocked by the separation barrier. It is also possible to prevent an unnecessary image from being seen by the driver by external light or the like entering from the outside to the inside of the head up display for a vehicle being reflected by the barrier wall.

The present invention encompasses various modifications to each of the examples and embodiments discussed herein.

According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A head up display for a vehicle, comprising:
    an imaging device configured to emit first linearly polarized light in a first direction and second linearly polarized light in a second direction perpendicular to the first direction;
    a polarizing reflection mirror through which the first linearly polarized light is transmitted and from which the second linearly polarized light is reflected;
    a second reflection mirror spaced apart from the polarizing reflection mirror and at which the first linearly polarized light transmitted through the polarizing reflection mirror is reflected to the polarizing reflection mirror; and
    a first reflection mirror spaced from the polarizing reflection mirror and configured to reflect the second linearly polarized light reflected from the polarizing reflection mirror to a windshield of the vehicle to produce a first image having a first length from the windshield, and to reflect the first linearly polarized light reflected from the second reflection mirror and transmitted through the polarizing reflection mirror to the windshield of the vehicle to produce a second image having a second length from the windshield different than the first length.

2. The head up display of claim 1, wherein the imaging device comprises:
    an image source configured to emit the first linearly polarized light in the first direction; and
    a half wavelength phase delay unit configured to convert a wavelength of a portion of the first linearly polarized light from the image source into the second linearly polarized light by a half of a wavelength.

3. The head up display of claim 2, wherein the image source comprises:
    a display panel configured to emit image light; and
    a linear polarizer configured to linearly polarize the image light emitted from the display panel in the first direction, and
    wherein the half wavelength phase delay unit faces a portion area of the linear polarizer.

4. The head up display of claim 2, wherein the half wavelength phase delay unit is between a light emitting surface of the image source and a surface of the polarizing reflection mirror.

5. The head up display of claim 2, wherein the polarizing reflection mirror faces the half wavelength phase delay unit and the image source in a vertical direction and faces the first reflection mirror in a longitudinal direction.

6. The head up display of claim 1, wherein the imaging device comprises:
    a display panel configured to emit image light;
    a first linear polarizer configured to linearly polarize the image light emitted from the display panel in the first direction to produce the first linearly polarized light; and
    a second linear polarizer configured to linearly polarize the image light emitted from the display panel in the second direction to produce the second linearly polarized light.

7. The head up display of claim 6, wherein the first linear polarizer and the second linear polarizer face different areas from each other of the display panel.

8. The head up display of claim 6, wherein the polarizing reflection mirror faces the first linear polarizer and the second linear polarizer in a vertical direction and faces the first reflection mirror in a longitudinal direction.

9. The head up display of claim 1, wherein the polarizing reflection mirror includes an anti-reflection coating layer on a surface facing the second reflection mirror.

10. The head up display of claim 1, wherein the polarizing reflection mirror is a wire grid polarizer disposed on a rear side of the first reflection mirror, and
    wherein the second reflection mirror includes a flat mirror facing the wire grid polarizer.

11. The head up display of claim 1, wherein front surfaces of the polarizing reflection mirror and the second reflection mirror are inclined toward a front lower side of the head up display.

12. The head up display of claim 1, wherein the polarizing reflection mirror is inclined between the first reflection mirror and the second reflection mirror.

13. The head up display of claim 1, further comprising:
    a quarter wavelength phase delay unit between the polarizing reflection mirror and the second reflection mirror.

14. The head up display of claim 13, further comprising:
    a third reflection mirror facing the polarizing reflection mirror in a portion of a front surface of the quarter wavelength phase delay unit.

15. The head up display of claim 2, wherein the half wavelength phase delay unit faces a portion of an emitting surface of the image source, and
    wherein the head up display further comprises a prism at which the first linear polarizing light emitted from the image source toward a portion other than the half wavelength phase delay unit is refracted between the image source and the polarizing reflection mirror.

16. The head up display of claim 1, further comprising:
    at least one rotating device configured to rotate at least one of the polarizing reflection mirror and the second reflection mirror.

17. The head up display of claim 2, wherein the imaging device further includes a separation barrier configured to prevent mutual interference of linearly polarized light in the first direction and linearly polarized light in the second direction.

18. The head up display of claim 17, wherein the separation barrier includes:
    a first barrier which is diagonally disposed on a light emitting surface of the image source; and
    a second barrier which is disposed away from the first barrier and the light emitting surface of the image source.

19. The head up display of claim 18, further comprising:
a space which is opened to face between the first reflection mirror and the polarizing reflection mirror between the first barrier and the second barrier.

20. The head up display of claim 18, wherein the first barrier includes a protrusion portion which protrudes toward the half wavelength phase delay unit, and
wherein the protrusion portion is formed on an end portion away from the image source of both end portions of the first barrier wall.

* * * * *